United States Patent [19]

Kodama

[11] Patent Number: 5,365,302
[45] Date of Patent: Nov. 15, 1994

[54] FOCUS AREA SETTING APPARATUS OF CAMERA

[75] Inventor: Shinichi Kodama, Tokyo, Japan

[73] Assignee: Olympus Optical Company, Ltd., Japan

[21] Appl. No.: 56,306

[22] Filed: Apr. 30, 1993

[30] Foreign Application Priority Data

| | | | |
|---|---|---|---|
| May 1, 1992 | [JP] | Japan | 4-112607 |
| Oct. 22, 1992 | [JP] | Japan | 4-284216 |
| Feb. 9, 1993 | [JP] | Japan | 5-021125 |

[51] Int. Cl.⁵ .......... G03B 13/36; G03B 17/24
[52] U.S. Cl. .......... 354/403; 354/409; 354/106; 354/195.1; 354/222
[58] Field of Search ........... 354/402, 409, 219, 62, 354/106, 105, 195.1, 195.12, 199, 222, 471, 474, 403

[56] References Cited

U.S. PATENT DOCUMENTS

| | | | |
|---|---|---|---|
| 3,804,496 | 4/1974 | Crane et al. | 351/210 X |
| 4,509,842 | 4/1985 | Taniguchi et al. | 354/402 |
| 4,574,314 | 3/1986 | Weinblatt | 354/400 X |
| 4,965,443 | 10/1990 | Yamasaki et al. | 250/201.7 |
| 5,245,371 | 9/1993 | Nagano et al. | 354/62 |
| 5,245,381 | 9/1993 | Takagi et al. | 354/219 X |

FOREIGN PATENT DOCUMENTS

| | | |
|---|---|---|
| 57-16411 | 1/1982 | Japan . |
| 61-61135 | 3/1986 | Japan . |
| 62-100718 | 5/1987 | Japan . |
| 62-102213 | 5/1987 | Japan . |
| 63-11906 | 1/1988 | Japan . |
| 63-94232 | 4/1988 | Japan . |
| 1190177 | 7/1989 | Japan . |
| 4255834 | 9/1992 | Japan . |

Primary Examiner—William B. Perkey
Attorney, Agent, or Firm—Laff, Whitesel, Conte & Saret

[57] ABSTRACT

A focus area setting apparatus of a camera includes a zoom lens. A focal length detection unit detects the focal length of the zoom lens. A distance measuring unit detects distances of an object at a plurality of distance measurement points without using the zoom lens. A visual axis direction detection unit is provided near the finder of the camera and detects the visual axis direction of a user. A determining unit obtains a distance measurement enable range Ls in accordance with an equation:

$$Ls = La \times (fs/fa)$$

where fs is a focal length detected by the focal length detection unit, fa is a focal length of the zoom lens at a wide-angle side thereof, and La is a distance measurement enable range at the wide-angle side of the zoom lens, and determines whether or not the visual axis direction of the user detected by the visual axis direction detecting means is located within the distance measurement enable range Ls. When the determining means determines that the visual axis direction is located within the distance measurement enable range, a focus area setting unit selects a distance measurement point, among the plurality of distance measurement points detected by the distance measuring means, which is closest to the visual axis direction of the user, and sets a focus area. A display unit displays the focus area set by the focus area setting unit.

53 Claims, 17 Drawing Sheets

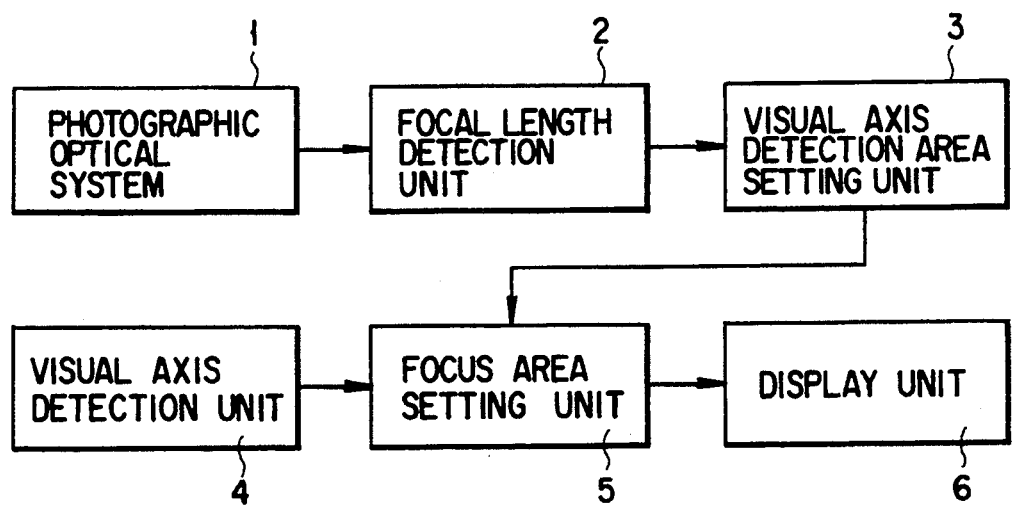
F I G. 1
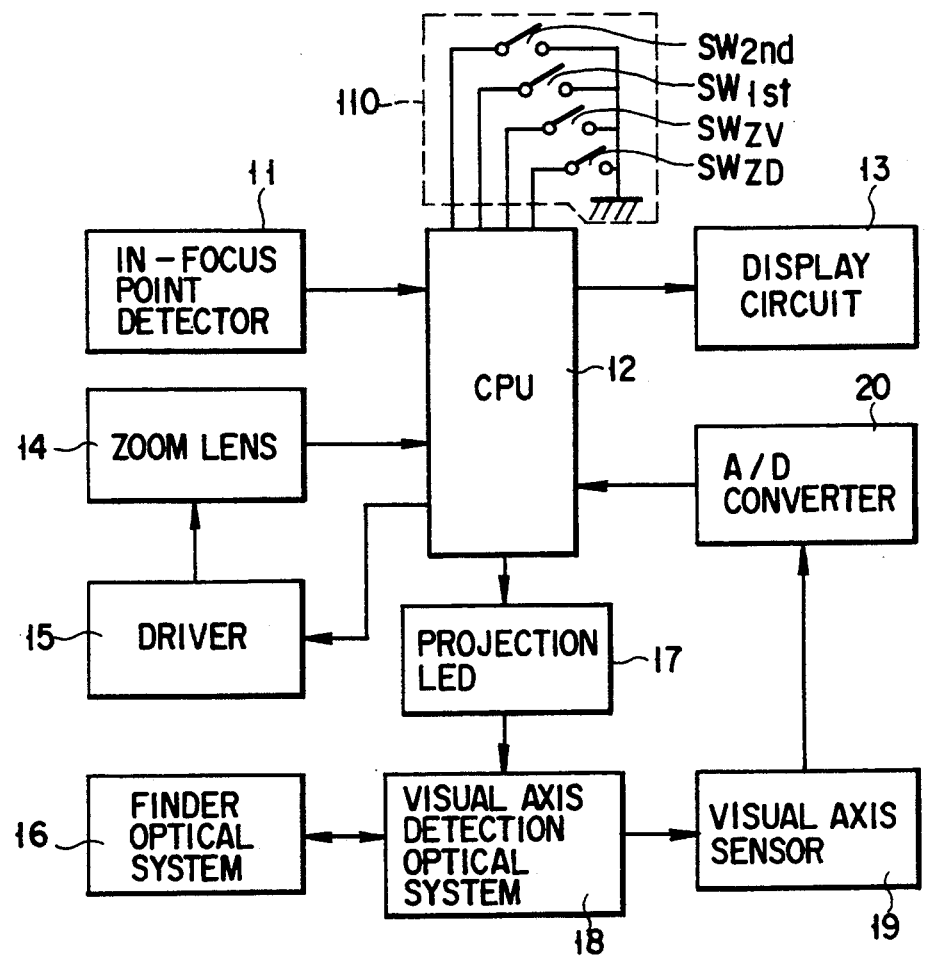
F I G. 2

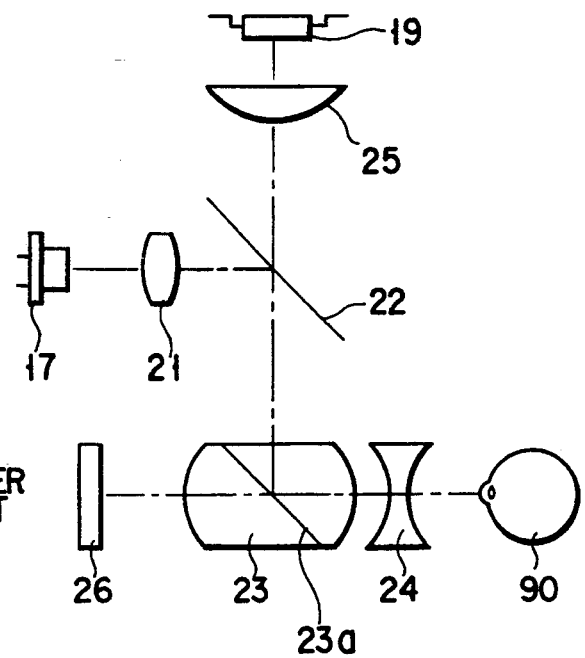
F I G. 3
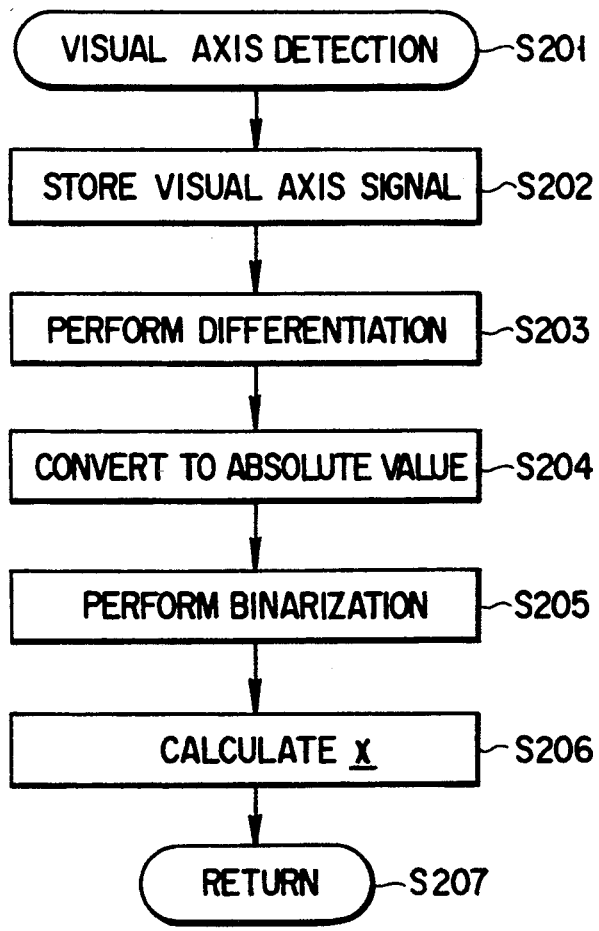
F I G. 5

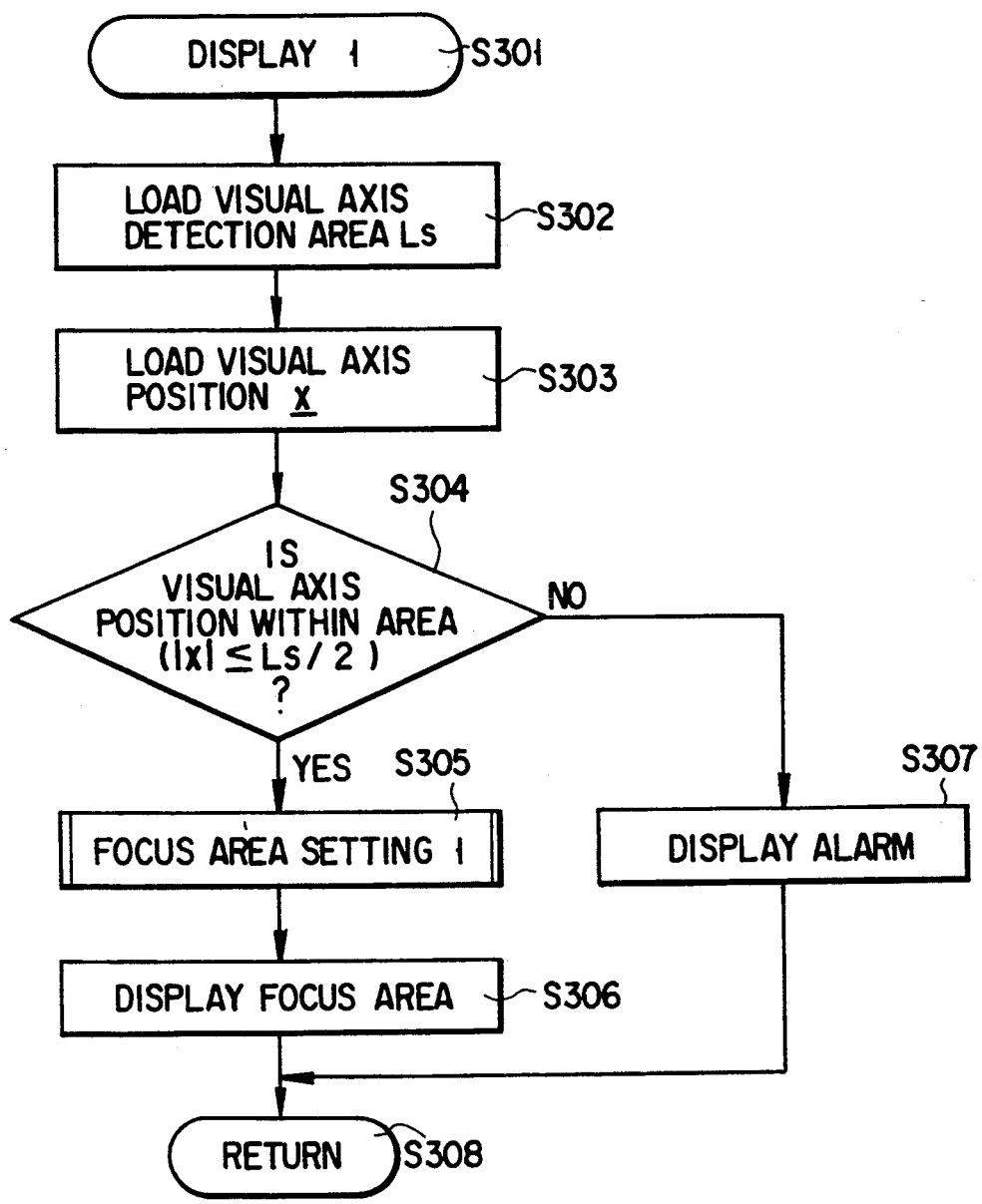
F I G. 6

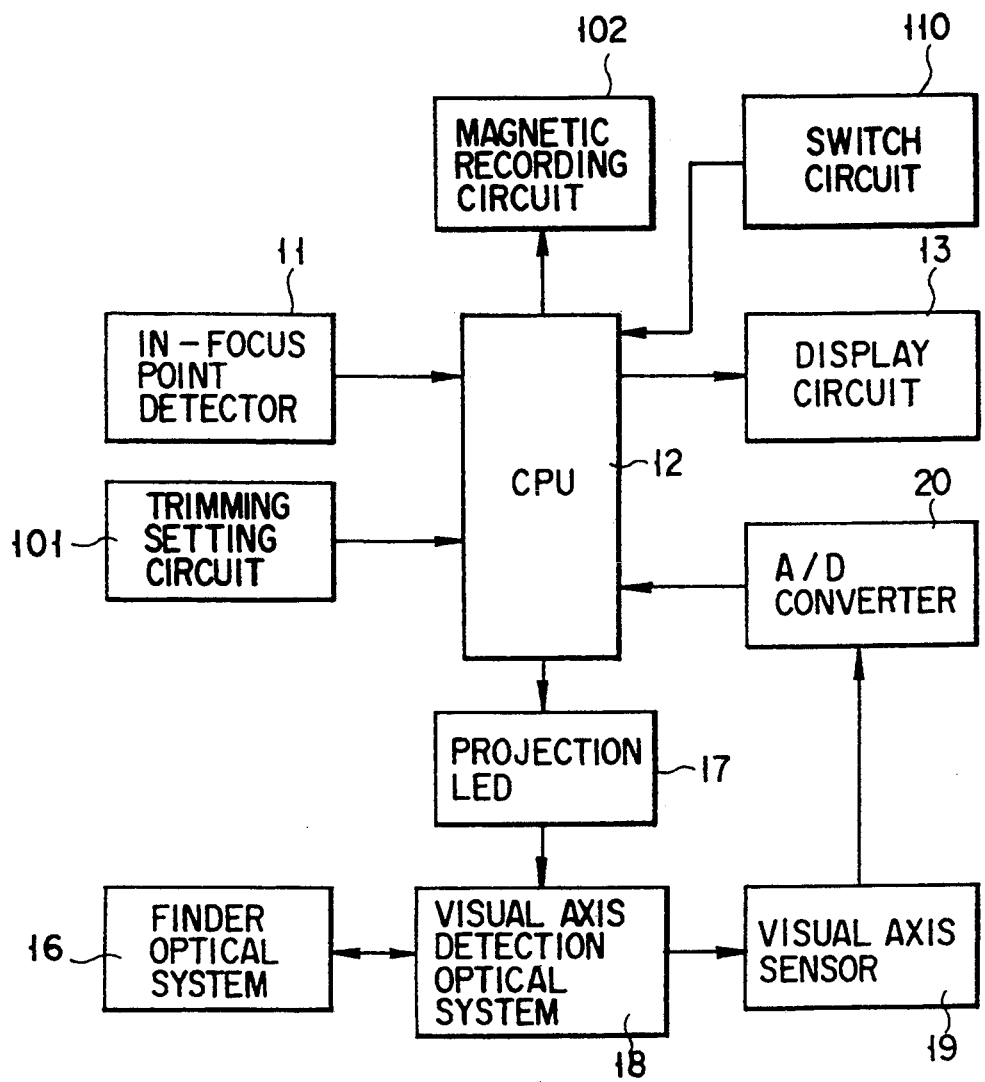
F I G. 9

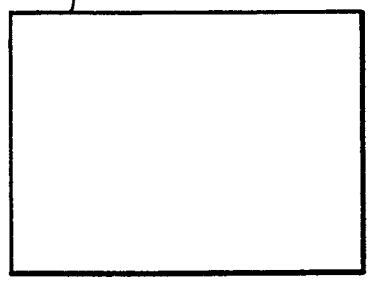
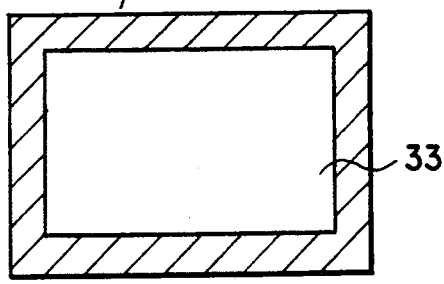
FIG. 13A   FIG. 13B
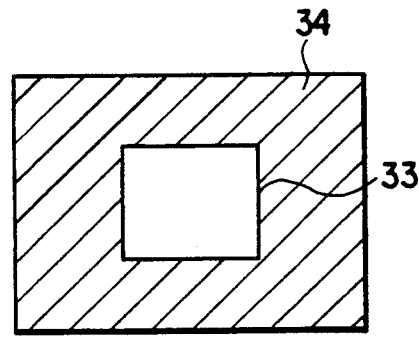
FIG. 13C
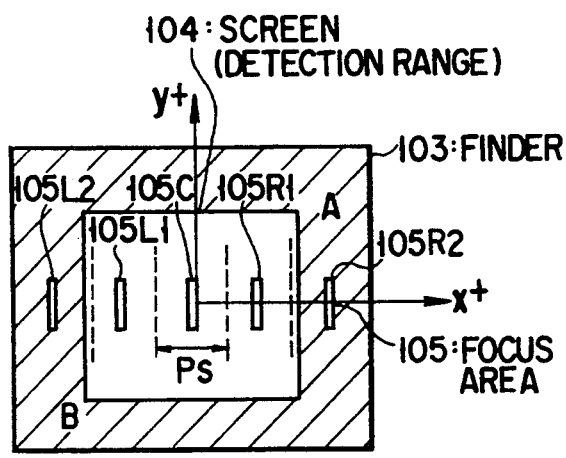
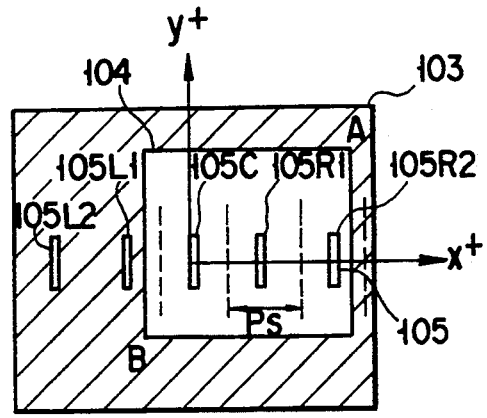
FIG. 14A   FIG. 14B

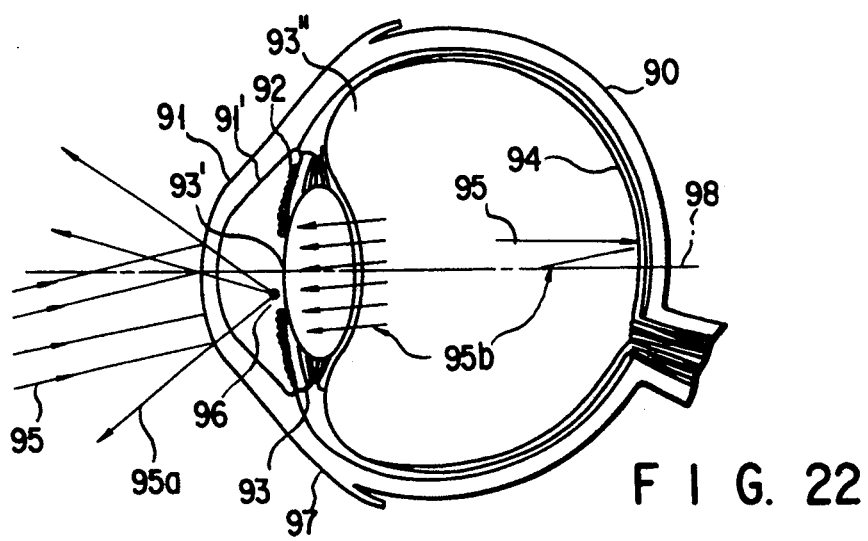
F I G. 22
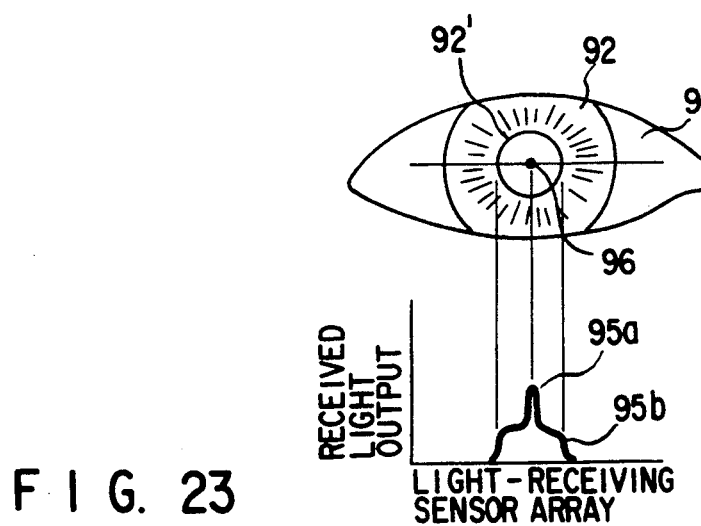
F I G. 23
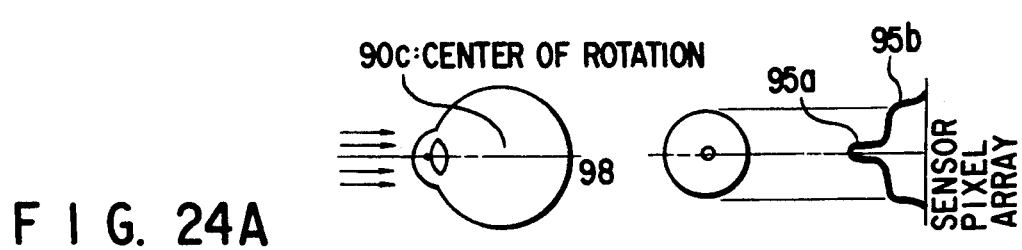
F I G. 24A
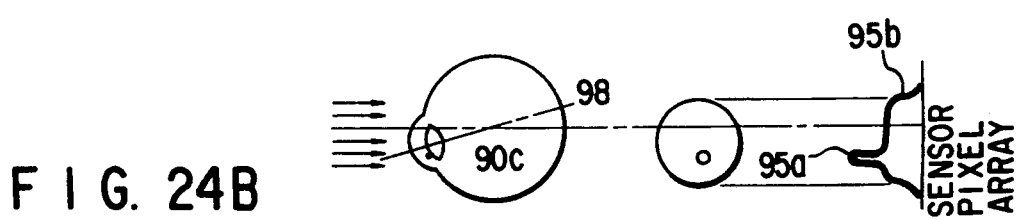
F I G. 24B

FOCUS AREA SETTING APPARATUS OF CAMERA

BACKGROUND OF THE INVENTION

1. Field of the Invention

The present invention relates to a camera and, more particularly, to a focus area setting apparatus of a camera which sets a focus area by using information representing the direction of visual axis of the user.

2. Description of the Related Art

Conventionally, various types of information are input to a camera by means of, e.g., a dial, a button, and the like. As the amount of input information is increased, however, the operation environment is becoming complicated.

For example, a technique for detecting the direction of the visual axis of a user looking into a finder and inputting information on the visual axis to a camera is disclosed by a large number of prior arts, e.g., U.S. Pat. No. 3,804,496, Published Unexamined Japanese Patent Application Nos. 1-190177, 61-61135, 63-94232, and the like.

In some recent cameras, the focus area is arranged to cover a wide range and is automatically selected and set by the camera in order to decrease the cumbersome operation.

Even in such a camera, however, the focus area is not always automatically set at a location desired by the user. Furthermore, it is still cumbersome to set the focus area by the manual operation. Hence, it has become important to facilitate the manual setting operation required for setting the focus area at the desired location by the user.

For this purpose, an apparatus has been proposed which detects the direction of visual axis of the user looking into the finder and sets the focus area in accordance with the detection result, as described above.

When the focus area setting apparatus is used in a camera having a zoom function, although the finger performs zooming to change the magnification of the object image, the direction of the distance measurement is not changed according to the external light type distance measurement scheme. Thus, when the focus area is to be set based on only the direction of visual axis of the user, an area falling outside the distance measurement range can sometimes be selected depending on the focal length.

For example, FIG. 27 shows a state wherein the focal length is changed in an external light type in-focus detecting apparatus which can perform distance measurement in a plurality of distance measurement directions that are not changed by zooming.

In FIG. 27, on a side where the focal length of the lens is small, i.e., on the wide-angle side, the distance measurement points in the finder are as shown in FIG. 28A. The area where the focus area exists, i.e., the distance measurement enable range is the range indicated by reference symbol La.

On a side where the focal length of the lens is large, i.e., on the telephoto side, the distance measurement points in the finder are as shown in FIG. 28B. The area where the focus area exists, i.e., the distance measurement enable range is the range indicated by reference symbol Lb.

As is seen from FIGS. 28A and 28B, the distance measurement enable range in the finder changes in accordance with a change in focal length of the photographic lens, and the distance between distance measurement points in the distance measurement enable range, i.e., the resolution also largely changes. Accordingly, a correct focus area cannot be set only in accordance with the direction of visual axis of the user detected by a visual axis direction detection unit.

Also, in a so-called trimming camera which changes an apparent magnification by trimming performed during printing, if visual axis detection is performed in the same area as shown in FIG. 29 and FIGS. 30A and 30B, accurate focus area selection may not be performed.

FIG. 29 is a view showing a case wherein a trimming area is displayed by driving the liquid crystal in the finder in accordance with the trimming state.

In the trimming state shown in FIG. 29, the hatched area will not be printed. Thus, it is meaningless to set a distance measurement point 104 as a focus area.

More specifically, if uniform visual axis detection is performed regardless of the trimming state, focus areas falling outside the trimming areas of a plurality of focus areas may be erroneously selected.

FIGS. 30A and 30B are views showing cases wherein only a finder system is zoomed in accordance with the trimming state. FIG. 30A shows an ordinary finder state, and FIG. 30B shows a finder state when trimming is performed.

Problems identical to those occurring in FIGS. 28A and 28B also occur in these cases. Furthermore, in a multi-TTL AF system using non-TTL auxiliary light, when the focal length of the photographic lens is changed, the effective range of the auxiliary light is also changed. Hence, the focus area set on the basis of the direction of visual axis of the user which is detected by the visual axis detection unit sometimes falls outside the effective range of the auxiliary light. In this case, when the object has a low brightness and a low contrast, the auxiliary light is not effectively radiated, and distance measurement may not be performed.

As described above, the distance measurement enable range in the finder and the resolution of the distance measurement point are changed in accordance with a change in substantial photographic field angle due to a change in focal distance, trimming magnification, and the like of the photographic lens, and an accurate focus areas cannot be set on the basis of the direction of visual axis of the user.

SUMMARY OF THE INVENTION

The present invention has been made in order to solve the above problems, and has as its object to provide a focus area setting apparatus of a camera which, when a focus area is to be determined by using a detected visual axis signal, prevents the focus area from being set in an unnecessary area by changing the distance measurement enable range in accordance with information representing a substantial photographic field angle, thereby improving the operability of focus area setting.

According to the focus area setting apparatus of the camera of the present invention, an field angle changing means substantially changes the field angle, a distance measuring means detects the object distances at a plurality of distance measurement points, and a visual axis direction detecting means provided in the vicinity of a finder detects the direction of visual axis of the user. A calculating means calculates the distance measurement enable range determined by the plurality of the distance measurement points on the basis of the information representing the change in field angle changed by the field angle changing means. A focus area setting means selects, from the distance measurement enable range determined by the calculating means, a distance measurement point closest to the direction of visual axis of the user, thereby setting the focus area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing the arrangement of a focus area setting apparatus according to the first embodiment of the present invention;

FIG. 2 is a view showing the arrangement of a focus area setting apparatus according to the second embodiment of the present invention;

FIG. 3 is a view showing the arrangement of a visual axis detection optical system 18 in detail;

FIG. 5 is a flow chart showing the sequence of a subroutine program "visual axis detection";

FIG. 6 is a flow chart showing the sequence of a subroutine program "display 1";

FIG. 9 is a view showing the arrangement of focus area setting apparatus according to the third embodiment of the present invention;

FIG. 13A is a view showing a detection area in a wide-angle state;

FIG. 13B is a view showing a detection area in an intermediate state between wide-angle and telephoto states;

FIG. 13C is a view showing a detection area in a telephoto state;

FIG. 14A is a view showing the state of trimming zoom with respect to an optical axis as the center;

FIG. 14B is a view showing the state of shift trimming zoom;

FIG. 22 is a view showing the arrangement of a human eyeball 90;

FIG. 23 is a view showing the state of a first Purkinje image as a virtual image of a light source formed by light reflected by a front surface 91 of the cornea;

FIG. 24A is a view showing the state of the first Purkinje image which is detected when the eyeball 90 is in the ordinary state;

FIG. 24B is a view showing a state wherein the first Purkinje image is charged by rotation of the eyeball 90;

DETAILED DESCRIPTION OF THE PREFERRED EMBODIMENTS

Figure 4:
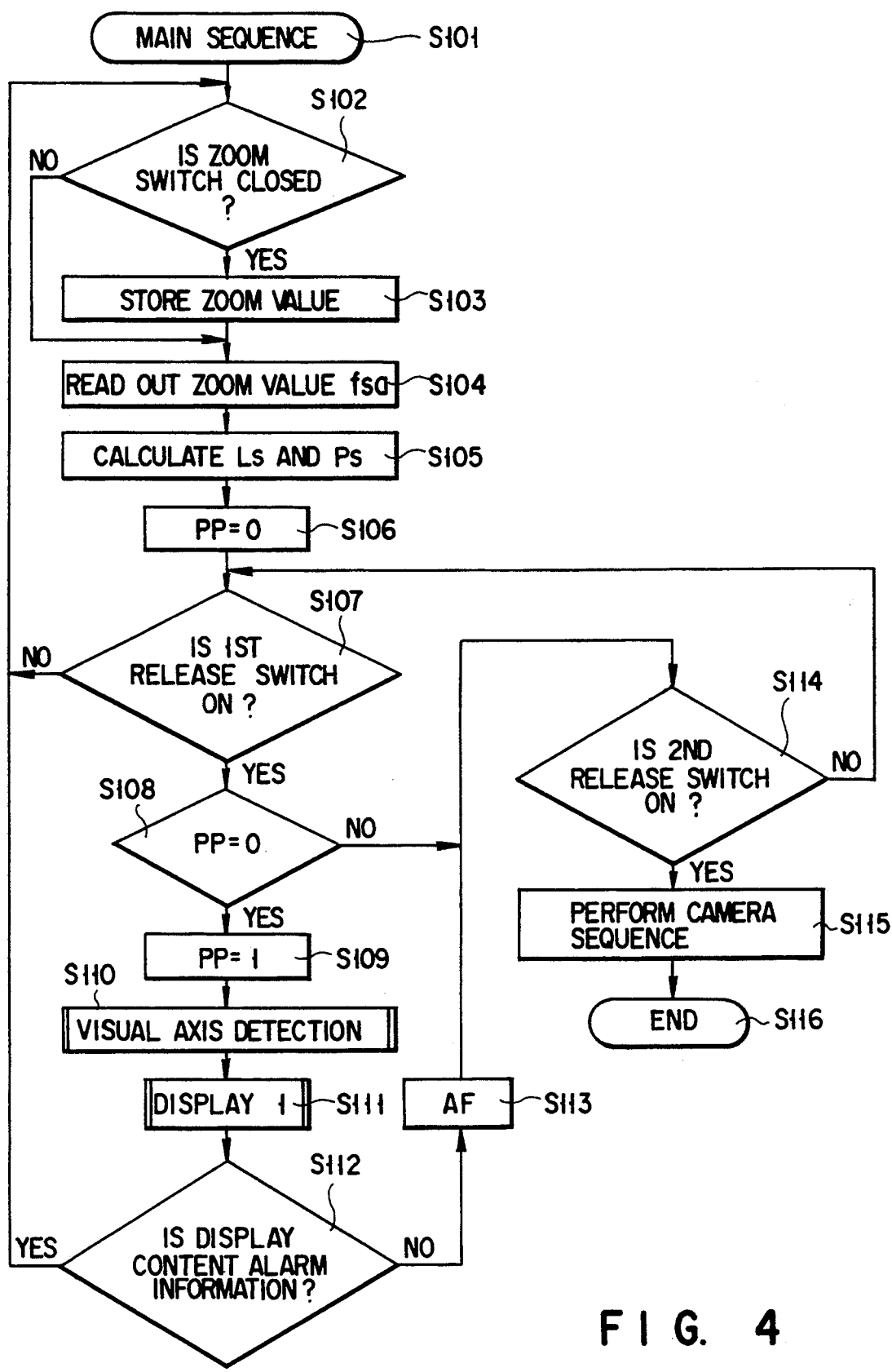
FIG. 4 is a flow chart showing the main sequence of the second embodiment.

Prior to an explanation on the preferred embodiments of the present invention, the principle of visual axis detection adopted by the embodiments of the present invention will be explained.

Various techniques are proposed as techniques each for detecting the direction of visual axis. As a technique easily adopted to a camera, a technique that performs detection by using the Purkinje images and the reflected fundic image or the edge of the iris will be briefly explained.

As shown in FIG. 22, generally, when light 95 passes through an eyeball 90, the light 95 is reflected by the respective interface portions. More specifically, the light 95 is reflected by interfaces including a front surface 91 of the cornea, a rear surface 91' of the cornea, a front surface 93' of the crystalline lens, and a rear surface 93" of the crystalline lens. Images formed by these reflections are known wall to those skilled in the art and are generally referred to as Purkinje images. The Purkinje images formed by reflections of the front surface 91 of the cornea, the rear surface 91' of the cornea, the front surface 93' of the crystalline lens, and the rear surface 93" of the crystalline lens are referred to as the first, second, third, and fourth Purkinje images, respectively. Referring to FIG. 22, reference numeral 92 denotes an iris; 93, a crystalline lens; 94, a retina; and 97, a sclera, respectively.

In the embodiments of the present invention, the visual axis is detected by utilizing the first Purkinje image. The first Purkinje image is a virtual image of a light source which is formed by light reflected by the front surface 91 of the cornea, and is the most intense reflected image also merely called as a reflected corneal image.

FIG. 23 shows the state of a first Purkinje image 95a as the reflected image. The first Purkinje image 95a having a high received light output is detected by projecting light to the eyeball 90 and receiving a reflected image. Purkinje images other than the first Purkinje image 95a are difficult to detect as they have small amounts of light reflection and are formed at different positions.

When light is projected to the eyeball 90, a fundic image obtained by light 95b reflected by the fundus is detected as the silhouette of a periphery 99 of the iris. The reflected fundic image 95b is shown in FIG. 23 together with the first Purkinje image 95a. The direction of visual axis is detected by using these two images.

As the eyeball 90 is rotated, the detection image is changed as shown in FIGS. 24A and 24B.

More specifically, when beams projected to the eye and an optical axis 98 of the eyeball 90 are parallel, as shown in FIG. 24A, the center of the reflected fundic image 95b, i.e., the center of iris and the center of the first Purkinje image 95a coincide.

When the eyeball 90 is rotated, as shown in FIG. 24B, the optical axis 98 is rotated about a center 90c of rotation of the eyeball 90. In this case, the center of the fundic image 95b can be received at a different position of a sensor pixel array that receives light reflected by the eye.

Furthermore, the center of the first Purkinje image 95a is received at a position relatively different from the position of the center of the fundic image 95b. This is because the center of the curved surface of the front surface 91 of the cornea is different from the center of rotation of the eyeball 90.

Accordingly, the amount of rotation and the amount of shift of the eyeball 90 of the user looking into the finder can be obtained from a difference in absolute position of these two images with respect to the sensor pixel array and a relative different between the two images, and where the user is looking at can be discriminated.

Processing to which the visual axis detection image is subjected, which is adopted by the embodiments of the present invention, will be described.

When the reflected corneal image 95a and the reflected fundic image 95b are clearly detected, accurate visual axis detection can be performed. When, however, the reflected fundic image 95b is distored or the reflected corneal image 95a is not accurately detected, accurate visual axis detection cannot be performed.

Figure 25A:
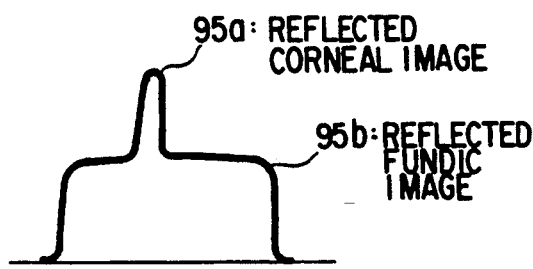
FIG. 25A is a chart showing a visual axis detection image.
Figure 25B:
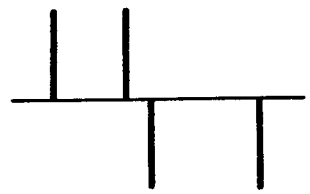
FIG. 25B is a chart showing a state obtained by differentiating a signal shown in FIG. 25A.
Figure 25C:
FIG. 25C is a chart showing a state obtained by converting the differentiated signal to an absolute value and binarizing the absolute value by a predetermined level Vs.
Figure 25D:
FIG. 25D is a chart showing four signal components detected when visual axis detection is normally performed.

For this reason, the signal shown in FIG. 25A is differentiated as shown in FIG. 25B, and the differentiated signal is converted to an absolute value. The absolute value of the signal is binarized by a predetermined level Vs, as shown in FIG. 25C. Then, as shown in FIG. 25D, when ordinary visual axis detection is performed, four signal components are detected.

In the embodiments of the present invention, the reliability of the visual axis detection image is determined by these calculations.

Detection of the angle of rotation obtained when the eyeball 90 is rotated from the direction of visual axis shown in FIG. 25A to the direction of visual axis shown in FIG. 26A will be described.

Figure 26A:
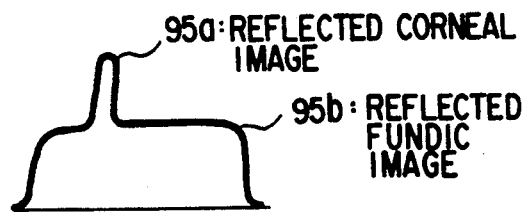
FIG. 26A is a chart showing a visual axis detection image.
Figure 26B:
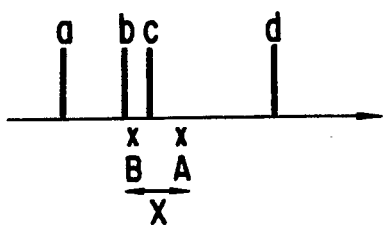
FIG. 26B is a chart showing a signal obtained by performing the series of processing operations of FIGS. 25A to 25D.
Figure 26C:
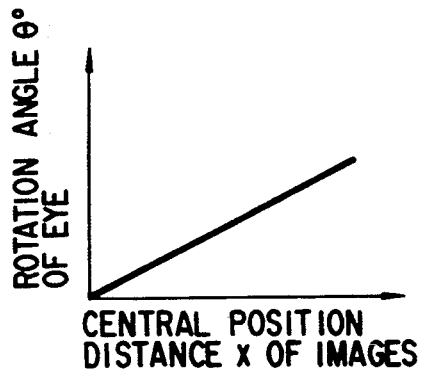
FIG. 26C is a graph showing the relationship between a central position distance X and an angle $\theta$ of rotation of the eyeball.
Figure 27:
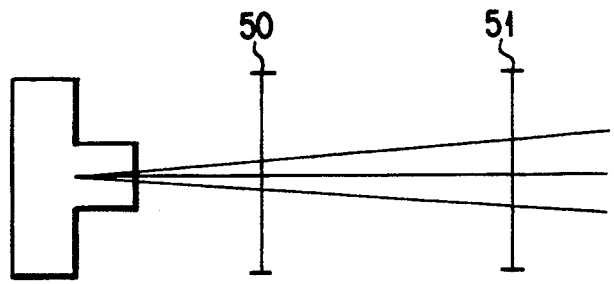
FIG. 27 is a view showing a state wherein the focal length is changed by an external light type in-focus detecting apparatus that can perform distance measurement in a plurality of distance measurement directions which are not changed by zooming.
Figure 28A:
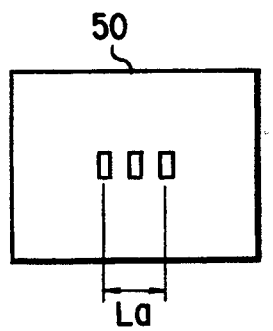
FIG. 28A is a view showing distance measurement points in a finder on a wide-angle side.
Figure 28B:
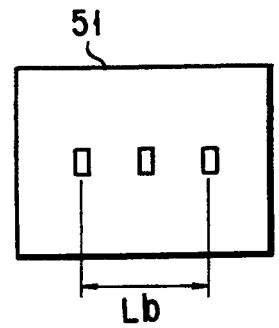
FIG. 28B is a view showing distance measurement points in a finder on a telephoto side.
Figure 29:
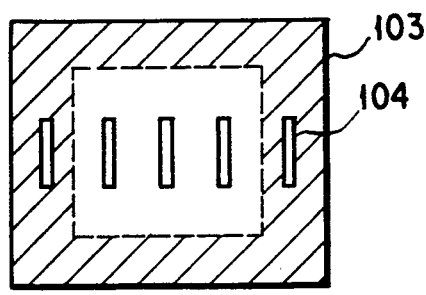
FIG. 29 is a view showing a state wherein the apparent magnification is changed by trimming performed during printing.
Figure 30A:
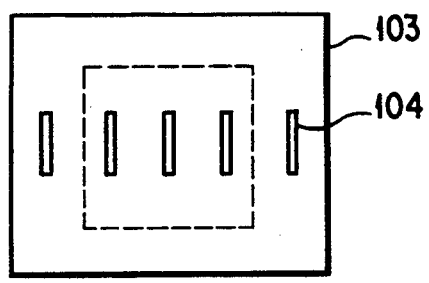
FIG. 30A is a view showing a focus area obtained in an ordinary finder state.
Figure 30B:
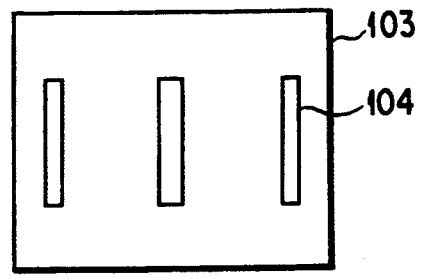
FIG. 30B is a view showing a focus area obtained in a finder during trimming.

The detection image of FIG. 26A is processed as described above to obtain signals shown in FIG. 26B. In FIGS. 26A and 26B, the axis of abscissa represents the coordinate of the pixel array. In the signals shown in FIG. 26B, the center between signals a and d is defined as A, the center between signals b and c is defined as B, and the length between A and B is defined as an image center position distance X. As shown in FIG. 26C, the center position distance X and an angle $\theta$ of rotation of the eyeball 90 are proportional. In the embodiments of the present invention, the angle of rotation is calculated from this proportional relationship.

The preferred embodiments of the present invention utilizing the principle of visual axis detection as described above will be described.

FIG. 1 is a view showing the arrangement of a focus area setting apparatus according to the first embodiment of the present invention. As shown in FIG. 1, a photographic optical system 1 is connected to a focal length detection unit 2 for detecting the focal length of the photographic optical system 1, and the focal length detection unit 2 is connected to a visual axis detection are setting unit 3 for setting the visual axis detection area of the user. The visual axis detection area setting unit 3 is connected to a focus area setting unit 5. The focus area setting unit 5 is also connected to a visual axis detection unit 4 for detecting the direction of visual axis of the user, and to a display unit 6.

With this arrangement, when the focal length of the photographic optical system 1 is detected by the focal length detection unit 2, information representing the focal length is output to the visual axis detection area setting unit 3. The visual axis detection area is set by the visual axis detection area setting unit 3 in accordance with the focal length information. The visual axis detection area coincides with a distance measurement enable range. When information representing the preset area is output to the focus area setting unit 5, if the visual axis detected by the visual axis detection unit 4 falls within the preset area on the basis of the preset area information, a focus area is set at an optimum position. Information representing the focus area preset in this manner is displayed on the display unit 6. If the detected visual axis falls outside the selectable area set by the visual axis detection area setting unit 3, the display unit 6 performs alarm display.

FIG. 2 is a view showing the arrangement of a focus area setting apparatus according to the second embodiment of the present invention, which is more practical than the first embodiment described above.

As shown in FIG. 2, an in-focus point detector 11 includes a known non-TTL multi-point active or passive scheme distance measurement circuit. The in-focus point detector 11 is connected to a central processing unit (CPU) 12, and the CPU 12 is connected to a display circuit 13. The CPU 12 is also connected to a zoom lens 14 through a zoom driver 15, and the zoom lens 14 is connected to the CPU 12. The CPU 12 is also connected to a projection LED 17, and the projection LED 17 and a zoom finder optical system 16 are connected to a visual axis detection optical system 18. The magnification of the zoom finder optical system 16 is changed in an interlocked manner with a change in focal length of the zoom lens 14. The visual axis detection optical system 18 is connected to a visual axis sensor 19, and the visual axis sensor 19 is connected to the CPU 12 through an analog/digital (A/D) converter 20. The CPU 120 also connected to a switch circuit 110 having a zoom-up ($SW_{ZU}$), a zoom-down switch ($SW_{ZD}$), a 1st release switch ($SW_{1st}$), and a 2nd release switch ($SW_{2nd}$).

With this arrangement, upon reception of a command from the CPU 12, the projection LED 17 projects light to an eyeball (not shown) through the visual axis detection optical system 18 and the finder optical system 16. Light reflected by the eyeball is received by the visual axis sensor 19 through the finder optical system 16 and the visual axis detection optical system 18. An output signal from the visual axis sensor 19 is converted to a digital signal by the A/D converter 20 and input to the CPU 12. The in-focus point detector 11 performs distance measurement in all the focus areas.

The CPU 12 selects in-focus point information on the basis of the signal output from the in-focus point detector 11, calculates the driving amount of the zoom lens 14, and outputs a driving amount signal to the driver 15. The zoom lens 14 is driven by the driver 15 on the basis of the driving amount signal.

The CPU 12 also detects the visual axis direction on the basis of the digital signal output from the A/D converter 20. If the visual axis direction falls within the visual axis detection area, a focus area is set, and the focus area information is output to the display circuit 13. The display circuit 13 displays the information representing the focus area.

If the visual axis direction falls outside the visual axis detection area, the CPU 12 outputs a display signal representing alarm information to the display circuit 13, and the display circuit 13 performs alarm display.

FIG. 3 is a view showing the arrangement of the visual axis detection optical system 18 in detail.

As shown in FIG. 3, a half mirror 22 is disposed, through a projection lens 21, on the optical path of the light projected by the projection LED 17. The projected light is reflected by the half mirror 22. A prism 23 is disposed on the optical path of the light reflected by the half mirror 22. The reflected light is further reflected by a reflecting surface 23a of the prism 23 and guided to an eyeball 90 of the user through a finder 24.

Light reflected by the eyeball 90 of the user is incident on the prism 23 through the finder 24 along the same optical path as the incident light, and reflected by the reflecting surface 23a of the prism 23. Light reflected by the reflecting surface 23a of the prism 23 passes through the half mirror 22 and is received by the visual axis sensor 19 through a light-receiving lens 25.

Light from the object is incident on the prism 23 through a display liquid crystal 26 that displays an image to be superposed on the object light, passes through the reflecting surface 23a of the prism 23, and is guided to the eyeball 90 of the user through the finder 24.

The main sequence of the second embodiment will be described with reference to the flow chart in FIG. 4.

When the sequence is started (step S101), the CPU 12 detects whether or not a zoom-up or zoom-down switch $SW_{ZU}$ or $SW_{ZD}$ is operated by the user, thereby determining whether or not the zoom value of the zoom lens 14 is changed (step S102).

If the zoom value is changed in step S102, the CPU 12 stores the focal length of the zoom lens 14 in accordance with the operation of the zoom-down or zoom-up switch $SW_{ZD}$ or $SW_{ZU}$ (step S103), and the flow advances to step S104. If the zoom-up or zoom-down switch $SW_{ZU}$ or $SW_{ZD}$ is not operated in step S102, the flow directly advances to step S104.

In step S104, the CPU 12 reads out a current zoom value fs stored in step S103. The range of the zoom value is fa<fs<fz (mm). Subsequently, in step S105, the CPU 12 calculates a visual axis detection area Ls matching the distance measurement enable range in the finder and a visual axis detection resolution Ps corresponding to the distance between the distance measurement points in the finder. Note that Ls has the origin at the center of the finder and is equally divided into Ls/2 on the light and left sides of the origin. Ls and Ps can be calculated by the following equations:

$$Ls = La \times (fs/fa) \tag{1}$$

$$Ps = Pa \times (fa/fa) \tag{2}$$

wherein La and Pa are detection range a resolution, respectively, which are obtained when the zoom value is fa.

Then, a flag PP is set to PP=0 (step S106), and the CPU 12 determines whether or not a 1st release switch $SW_{1st}$ is ON (step S107).

If the 1st release switch $SW_{1st}$ is OFF in step S107, the flow returns to step S102; if ON, the CPU 12 determines whether or not the flag PP is "0" (step S108).

If the flow advances to step S107 for the first time after the 1st release switch $SW_{1st}$ is depressed, since the CPU 12 has set the flag PP to "0" in step S106, the flow advances to step S109 to set the flag PP to "1".

If the flow returns from step S114 for the first time after the 1st release switch $SW_{1st}$ is depressed, since the CPU 12 has set the flag PP to "1", the flow advances to step S114.

In step S110, the CPU 12 executes a subroutine program for visual axis detection to be described later. Subsequently, the CPU 12 executes a subroutine program "display 1" to be described later, displays information regarding the visual axis by the display circuit 13 (step S111), and determines whether or not the display content is alarm information (step S112). Then, if the CPU 12 determines that the display content is alarm information, the flow returns to step S102. If the CPU 12 determines that the display content is focus information, the CPU 12 performs in-focus point detection of the detected focus area in step S113, and the flow advances to step S114.

In step S114, the CPU 12 determines whether or not a 2nd release switch (a switch $SW_{2nd}$ in a switch circuit 110) in ON. If the switch $SW_{2nd}$ is OFF, the flow returns to step S107; if ON, the flow advances to step S115. In step S115, the CPU 12 performs a camera sequence after the AF operation, e.g., the AE operation, exposure, the film winding operation, and the like, an this sequence is completed (step S116).

The sequence of a subroutine program "visual axis detection" will be described with reference to the flow chart of FIG. 5.

When this subroutine program is started (step S201), the CPU 12 causes the LED 17 to project light, and visual axis data obtained by A/D-converting an output from the visual axis sensor 19 obtained at this time is stored in the memory (step S202). The CPU 12 differentiates the stored visual axis data in the same manner as in FIG. 25B (step S203). Then, the CPU 12 binarizes the differentiated signal by a predetermined level in the same manner as in FIG. 25C (step S205) and calculates a barycentric distance X between the reflected corneal image and the reflected fundic image in accordance with the processing described with reference to FIGS. 25A to 25D (step S206), and the flow ends this sequence (step S207). The barycentric distance X is expressed such that the center of finder screen is set to "0".

The sequence of a subroutine program "display 1" concerning display of visual axis information will be described with reference to the flow chart in FIG. 6.

When this subroutine program is started (step S301), the cpu 12 loads in an area (Ls, Ps information) effective or visual axis detection (step S302). In step S302, the detection area Ls and the detection resolution Ps calculated in step S105 are read out. The CPU 12 then loads in a position information visual axis coordinate x obtained in step S206 (step S303) and determines whether or not the loaded visual axis position is within the previously loaded area effective for visual axis detection, i.e., whether or not $|x| \leq Ls/2$ (step S304).

When the CPU 12 determines that the visual axis position is within the above area, it executes a subroutine "focus area setting 1" to be described later (step S305) and displays the preset focus area (step S306). When the CPU 12 determines that the visual axis position is not within the above area, it displays an alarm (step S307), and the flow ends this sequence (step S308).

Figure 7:
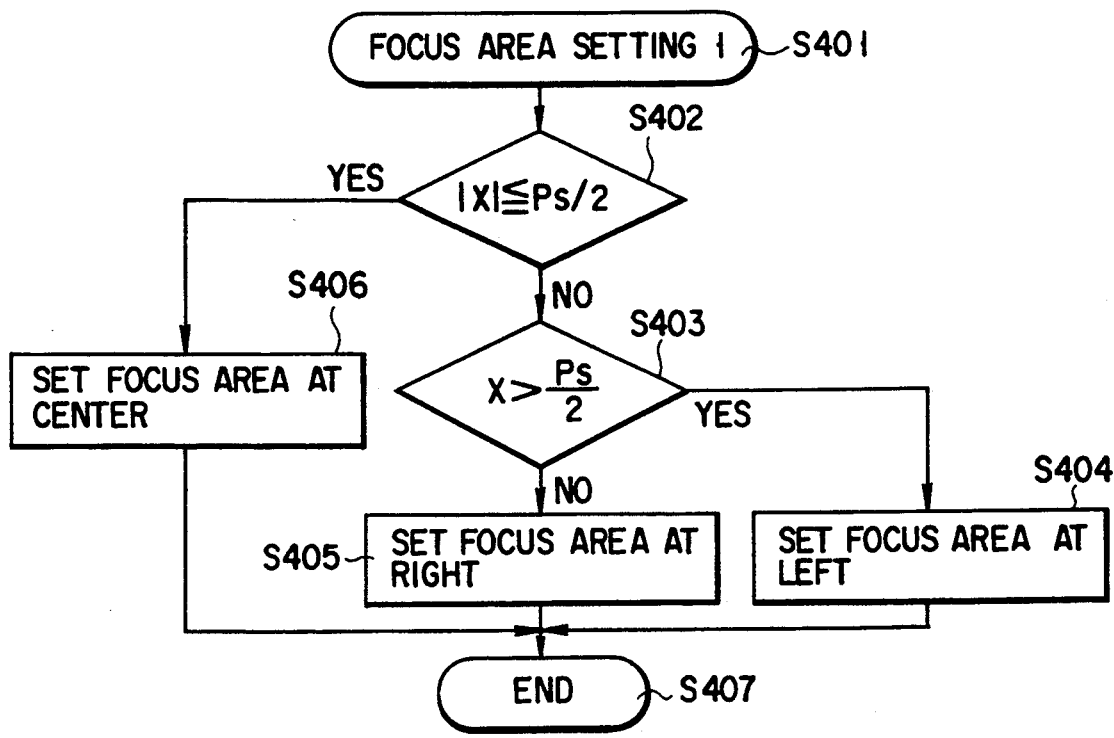
FIG. 7 is a flow chart showing the sequence of a subroutine program "focus area setting 1"

FIG. 7 is a flow chart showing the sequence of the subroutine program "focus area setting 1".

When this subroutine program (focus area setting 1) is started (step S401), the CPU 12 determines the visual axis coordinate x (step S402). In step S402, the CPU 12 determines whether or not $|x| \leq Ps/2$ is established in order to determine whether the detected visual axis coordinate x is within the visual axis detection resolution Ls.

When the relationship represented by the above inequality is established, the visual axis is located substantially within the central distance measurement area, and thus the focus area is set at the central portion. The flow advances to step S407 to end this subroutine, and returns to the main sequence. When the relationship represented by the above inequality is not established, although the user looks at the visual axis detection area, he does not look at the substantially central distance measurement area. Therefore, the CPU 12 determines x again (step S403). In this case, the CPU 12 determines whether or not $x > Ps/2$.

If $x > Ps/2$, p the focus area is set on the left side (step S404). If $x > Ps/2$ is not established, the focus area is set on the right side (step S405). Then, the flow ends this sequence in step S407 and returns to the main sequence.

Figures 8A, 8B:
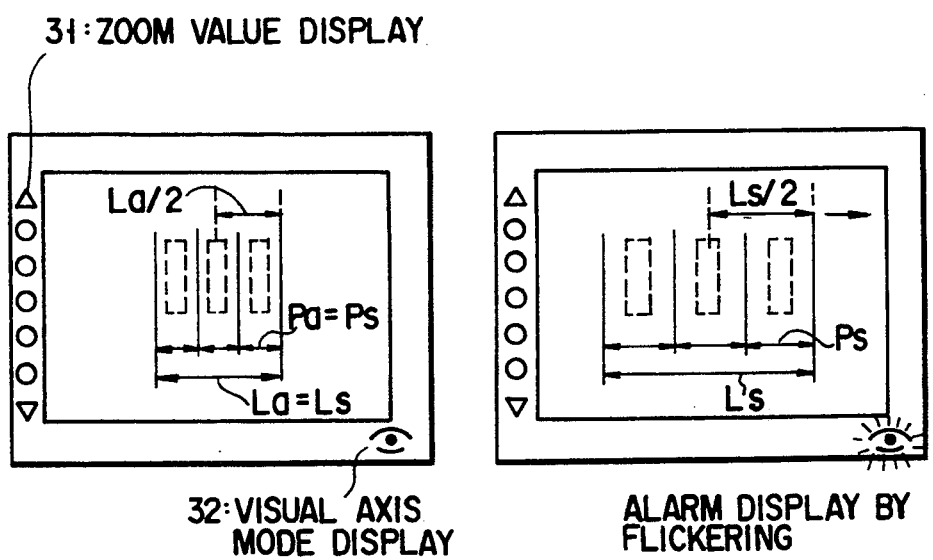
FIG. 8A is a view showing the state of change in actual finder display wherein a current focal length fs indicates a wide-angle end satisfying fs=fa (where fa is a wide-angle end)
FIG. 8B is a view showing a state wherein the focal length fs indicates a state satisfying fa<fs<fz (where fz is a telephoto end)

FIGS. 8A and 8B are views showing states of change in actual finder display.

FIG. 8A shows a state wherein a current focal length fs indicates a wide-angle and satisfying fs=fa (where fa is a wide-angle and). The detection resolution is Ps=Pa. FIG. 8B is a view showing a state wherein the focal length fs indicates a state satisfying fa < fs < fz (where fz is a telephoto end). More specifically, the detection area Ls is larger than La, and the detection resolution Ps is lower than Pa.

Note that the area Ls is located at the center of the finder and is of the same size on the right and left sides. The current zoom state read out in step S104 is displayed on a display 31, and the visual axis mode is displayed on a display 32. If the visual axis is not within the detection area, the display 32 flickers to make an alarm to the user.

When the finder display is arranged as in this embodiment, an area in which a visual axis signal can be detected on the basis of the focal length information of the photographic optical system can be set, and when the visual axis is detected, accurate focus area setting can be performed without requiring a cumbersome operation.

The third embodiment of the present invention will be described.

The characteristic feature of the third embodiment resides in the following respects. That is, even in a system, e.g., a trimming camera, an SV or the like having an electronic zoom function which is capable of setting a field angle by a post-processing operation on the basis of a signal similar to the focal length information of the photographic optical system, i.e., a pseudo zoom value, an area in which a focus area can be set can be changed by a visual axis detection system similar to that of the first embodiment in accordance with the pseudo zoom value.

A trimming camera for recording change information representing the screen size on a magnetic track formed on part of a silver salt film will be described in detail.

FIG. 9 is a view showing the arrangement of a focus area setting apparatus according to the third embodiment of the present invention. As shown in FIG. 9, the third embodiment has an arrangement almost similar to that of the second embodiment, and the screen is switched by a trimming setting circuit 101 in place of an optical zoom (the zoom lens 14 and the driver 15). A trimming switch SW for setting a trimming area is provided in the trimming setting circuit 101. The focus area setting apparatus has a magnetic recording circuit 102 for recording, on the film, trimming information representing a trimming area set by the trimming setting circuit 101.

Figure 10:
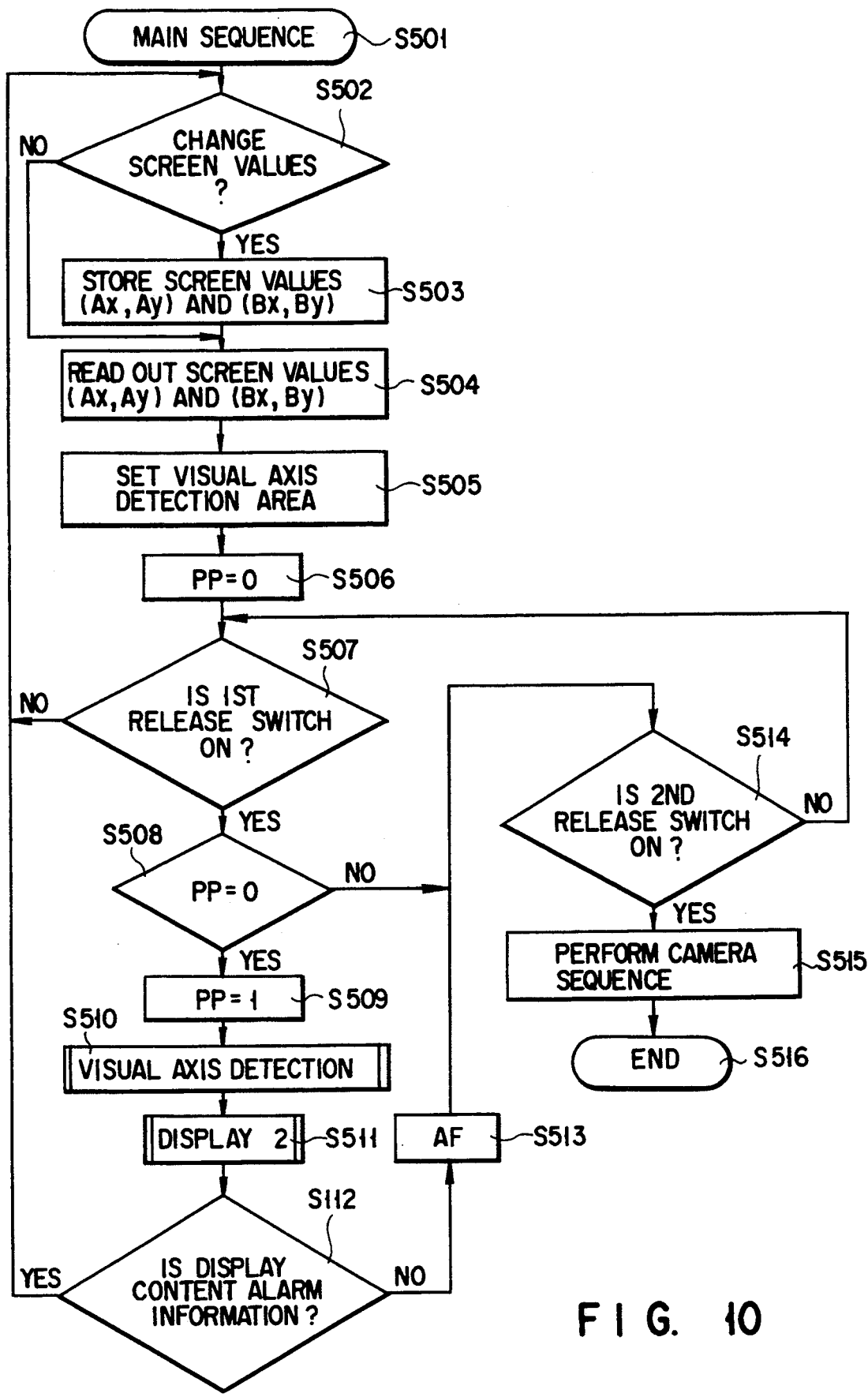
FIG. 10 is a flow chart showing the main sequence of the third embodiment.

The main sequence of the third embodiment will be described with reference to the flow chart in FIG. 10.

When the main sequence is started (step S501), a CPU 12 determines whether or not the screen values are changed by the trimming setting circuit 101 (step S502). In step S502, if a new trimming area is not set, the flow advances to step S504. If a new trimming area is to be set, i.e., the screen values are to be changed, the CPU 12 stores a trimming area of (Ax,Ay) and (Bx,By) set by the trimming setting circuit 101 (step S503).

In step S504, the CPU 12 reads out information on two diagonal points A (Ax,Ay) and B (Bx,By) representing the screen values stored in step S503 from its storage. In step S505, the CPU 12 sets a detection area in accordance with the two coordinate points A (Ax,Ay) and B (Bx,By) concerning trimming. More specifically, in step S505, the CPU 12 sets, as the detection area, the interior of a rectangle having the points A (Ax,Ay) and B (Bx,By) as the two diagonal points.

Then, the CPU 12 sets a flag PP to PP=0 9 step S506), and determines whether or not a 1st release switch $SW_{1st}$ in a switch circuit 110 in ON (step S507).

If the CPU 12 determines that the 1st release switch $SW_{1st}$ is OFF in step S507, the flow returns to step S502; if ON, the CPU 12 determines whether or not the flag PP is "0" (step S508).

If the flow advances to step S507 for the first time after the 1st release switch $SW_{1st}$ is depressed, since the CPU 12 has set the flag PP to "0" in step S506, the flow advances to step S509 to set the flag PP to "1".

If the flow returns from step S514 for the first time after the 1st release switch $SW_{1st}$ is depressed, since the CPU 12 has set the flag PP to "1", the flow advances to step S514.

In step S510, the CPU 12 executes the subroutine program "visual axis detection" shown in FIG. 5 described before. In the second embodiment, since the visual axis is detected only in the one-dimensional direction, only the x coordinate is detected. However, in the third embodiment, the visual axis is detected in the two-dimensional direction, and both the x and y coordinates are detected.

Subsequently, in step S511, the CPU 12 executes a subroutine program "display 2" to be described later for displaying information regarding the visual axis on a display circuit 13, and determines whether or not the display content is alarm information (step S512). If the CPU 12 determines that the display content is alarm information, the flow returns to step S502. If the CPU 12 determines that the display content is focus information, the CPU 12 performs in-focus point detection of the detected focus area by using an in-focus point detector 11 (step S513), and the flow advances to step S514. In step S514, the CPU 12 determines whether or not a 2nd release switch $SW_{2nd}$ in the switch circuit 110 is ON. If the switch $SW_{2nd}$ is OFF, the flow returns to step S507; if ON, the flow advances to step S515.

In step S515 representing a camera sequence, the CPU 12 performs a camera sequence after the AF operation, e.g., the AE operation, exposure, the film winding operation, and the like. In this case, in a sequence concerning the film winding or rewinding operation, information concerning trimming (the points A and B concerning trimming) is recorded on the magnetic track of the film, and this sequence is completed (step S516).

Figure 11:
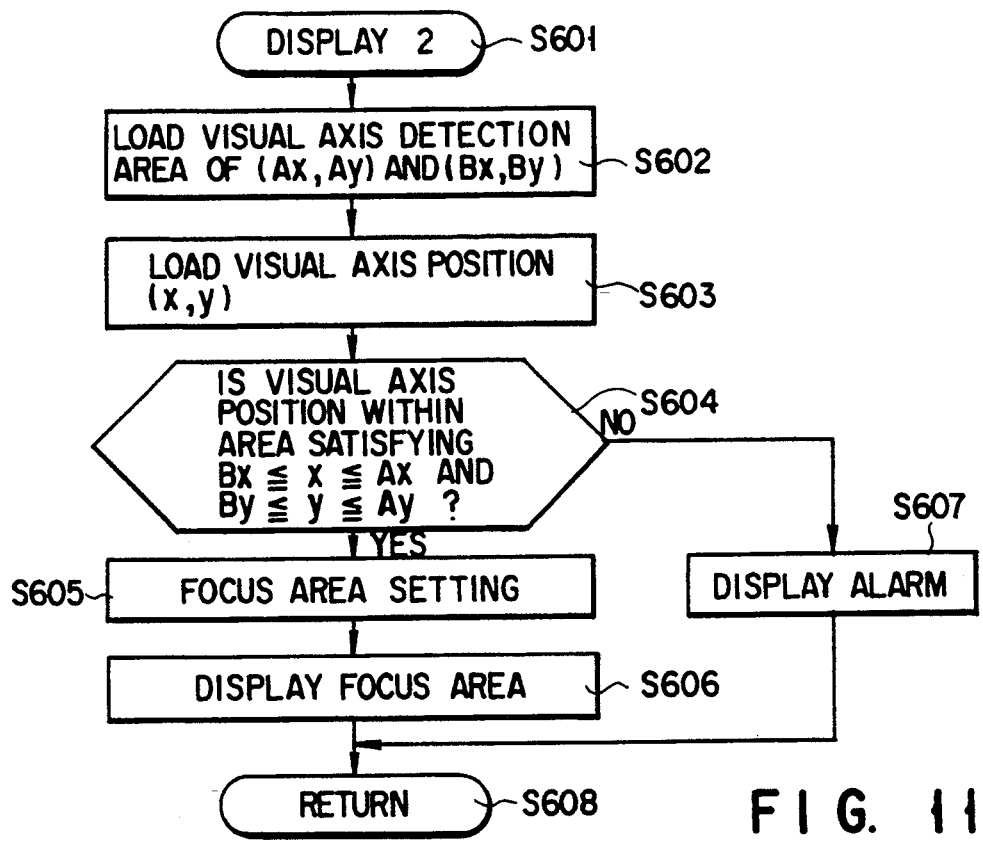
FIG. 11 is a flow chart showing the sequence of a subroutine program "display 2"

The sequence of the subroutine program "display 2" will be described with reference to the flow chart in FIG. 11.

When this subroutine program "display 2" is started (step S601), the CPU 12 loads in a trimming area stored in step S503, i.e., the points A (Ax,Ay) and B (Bx,By) of the area effective for visual axis detection (step S602).

Subsequently, the CPU 12 loads in the visual axis coordinate point (x,y) detected in step S510 (step S603). The CPU 12 then determines whether or not the loaded visual axis coordinate point (x,y) is within the visual axis detection area (step S604). In this case, the CPU 12 determines whether or not a relationship represented by equations $Bx \geq x \geq Ax$ and $By \geq y \geq Ay$ is established.

If the relationship represented by the above equations is not established, the visual axis of the user is not within the trimming area. Thus, the CPU 12 displays an alarm (step S607). The flow advances to step S608 and then returns to the main sequence.

If the relationship represented by the above equations is established, the visual axis of the user is within the trimming area determined by the two points A and B. Thus, the CPU 12 executes a subroutine "focus area setting 2" to be described later (step S605).

The CPU 12 displays the preset focus area (step S606). The flow advances to the step S608, ends this sequence, and returns to the main routine.

Figure 12:
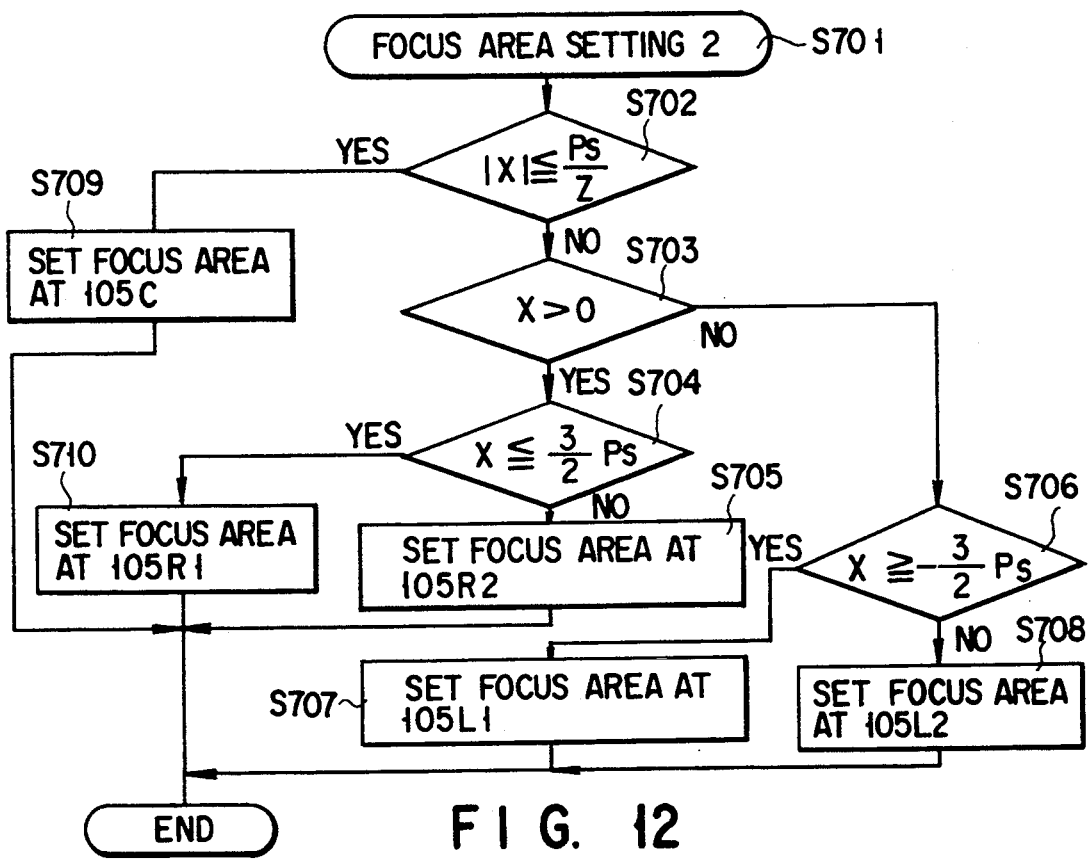
FIG. 12 is a flow chart showing the sequence of a subroutine program "focus area setting 2"

The sequence of the subroutine program "focus area setting 2" will be described with reference to the flow chart in FIG. 12.

When the subroutine "focus area setting" is started (step S701), the CPU 12 determines the visual axis coordinate x (step S702). In this case, the CPU 12 compares the absolute value $|x|$ of the visual axis coordinate and ½ of the visual axis detection resolution, i.e., Ps/2, If $|x| \leq Ps/2$, the visual axis of the user is directed to substantially the center of the screen. Thus, the CPU 12 sets the focus area at the center (step S709). In step S711, this subroutine is completed, and the flow returns to the main sequence.

If $|x| \leq Ps/2$ is not established, the CPU 12 determines from the sign of x whether the visual axis is directed to the right or left (step S703). If $x>0$ in step S703, the visual axis of the user is directed to the right. Thus, the CPU 12 determines the visual axis of the user is included in a right focus area 105R1 or 105R2 (step S705).

As the result of these determination operations, if $0<x \leq 3 \cdot Ps/2$, the focus area 105R1 is set (step S710).

As the result of these determinations, if $x>3 \cdot Ps/2$, the focus area 105R2 is set (step S705).

Furthermore, as the result of the determination, if $0>x \geq -3 \cdot Ps/2$, the focus area 105L1 is set (step S707).

As the result of the determination, if $x<-3 \cdot Ps/2$, the focus area 105L2 is set (step S708).

After the focus area is set in this manner, the flow ends this sequence and returns to the main routine (step S711).

FIGS. 13A to 13C are views showing finder states and detection areas in respective states from the wide-angle state to the telephoto state.

FIG. 13A shows a state wherein the wide-angle state is selected by the trimming setting circuit 101. In this state, the entire surface of the finder is a detection area 33.

FIG. 13B shows an intermediate state between the wide-angle and telephoto states. In this state, the detection area 33 is smaller than that in FIG. 13A and the portion of the finder other than the detection area is light-shielded by a liquid crystal display 34.

FIG. 13C shows a telephoto state. In this state, the portion of the finder other than the detection area is light-shielded by the liquid crystal display 34.

In any of these states, the area light-shielded by the liquid crystal display 34 will not be printed.

FIGS. 14A and 14B are views showing the states of the finder determined by the preset trimming points A and B. In the third embodiment, as described above, five focus points 105C, 105R1, 105R2, 105L1, and 105L2 are set, and the detection resolution corresponding to each of the distances between the respective focus points is Ps.

FIG. 14A shows trimming zoom about the optical axis, and FIG. 14B shows shift trimming zoom.

Figure 15:
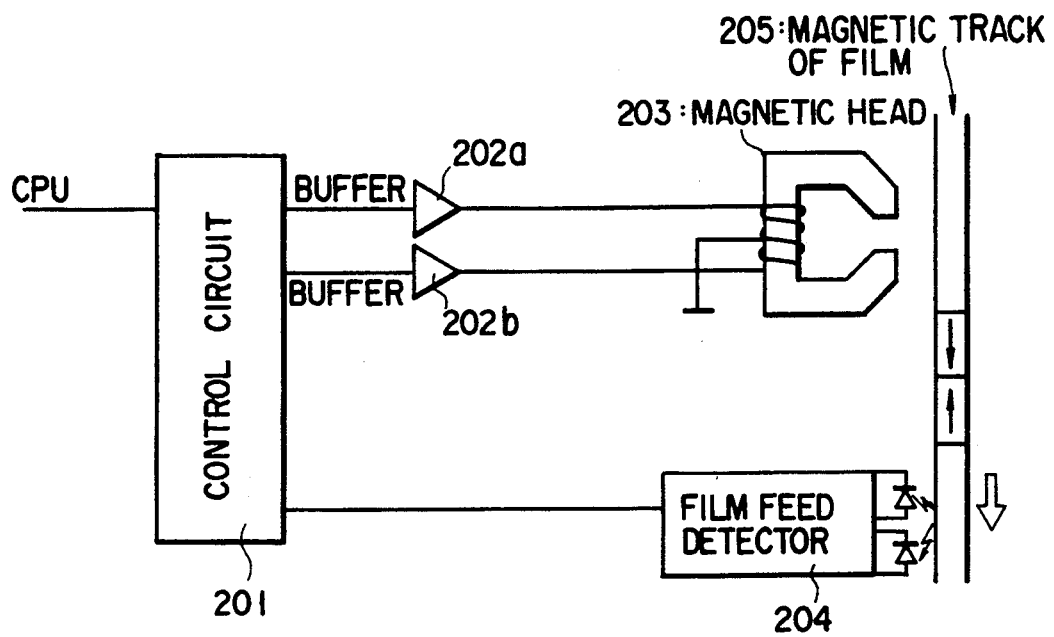
FIG. 15 is a view showing the circuit configuration of a magnetic recording circuit 102 which records detected trimming setting points A and B on the magnetic track of a film.

FIG. 15 is a view showing the circuit configuration of the magnetic recording circuit 102 for recording the detected preset trimming points A and B on the magnetic track of the film.

Referring to FIG. 15, a control circuit 201 performs write control to a film 205 in accordance with a coordinate signal from the CPU 12 and the state of a film feed detector 204 for detecting the film feed state. More specifically, upon reception of a control signal from the control circuit 201, a magnetic head 203 is driven through buffers 202a and 202b, and a signal is written on the magnetic track of the film by the magnetic head 203. In this case, the film feed state is detected by a photoreflector, and the detected film feed state is transmitted to the control circuit 201 through the film feed detector 204. The write rate of the write signal is changed by the control circuit 201 in accordance with the film feed amount (or feed speed).

The third embodiment of the present invention has been described above. The third embodiment has the arrangement as described above in order to set the visual axis detection area on the basis of pseudo zoom value information (trimming areas A and B) set by the trimming setting circuit. Therefore, the focus area can be smoothly set at an optimum area by a visual axis signal without requiring a cumbersome operation.

In the third embodiment, finder display need not be performed by means of a liquid crystal, but only the finder optical system may zoom or shift. Finder display may be combined with liquid crystal display. The trimming information may be recorded by means of focal length information about the optical axis as the center in place of the coordinates of two points. The distance measurement scheme can be the external light or TTL type and can be used also in a trimming camera that does not perform recording on a film.

A focus area setting apparatus according to the fourth embodiment of the present invention will be described.

Figure 16:
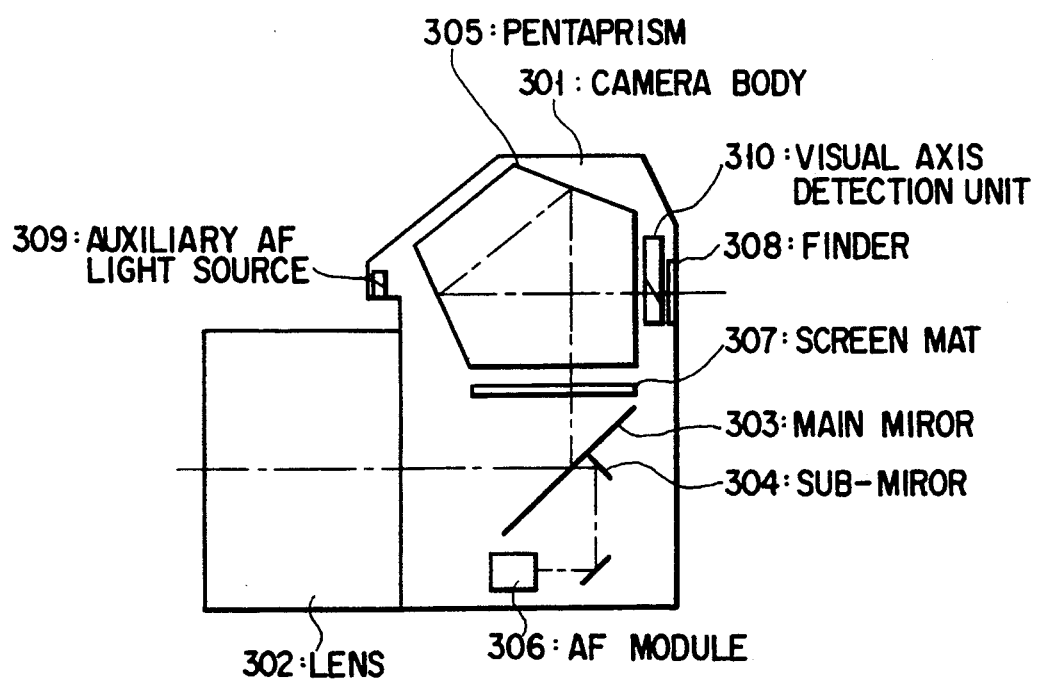
FIG. 16 is a view showing, in detail, the arrangement of the optical system of a focus area setting apparatus according to the fourth embodiment of the present invention.

FIG. 16 is a view showing in detail the arrangement of the optical system of the focus area setting apparatus according to the fourth embodiment of the present invention.

As shown in FIG. 16, a main mirror 303 is disposed on the optical path of light passing through a lens 302. A screen net 307 and a pentaprism 305 are disposed in the order named on the optical path of light reflected by the main mirror 303. Furthermore, a visual axis detection unit 310 is disposed on the optical path of light reflected by the pentaprism 305. A finder 308 is provided on the optical path of light passing through the visual axis detection unit 310. A sub-mirror 304 is disposed on the optical path of light passing through the main mirror 303. An AF module 306 is disposed on the optical path of light reflected by the sub-mirror 304.

The AF module 306 can perform distance measurements at a plurality of points by a known passive phase difference scheme. In addition to the components described above, a camera body 301 also has an auxiliary AF light source 309 for emitting light when the object has a low brightness and a low contrast, as will be described later. The auxiliary AF light source 309 has a predetermined radiation angle, and the radiation angle is not completely interlocked with that of a zoom lens 14.

With this arrangement, the beam passing through the lens 302 is reflected by the main mirror 303, and guided to the finder 308 through the screen mat 307, the pentaprism 305, and the visual axis detection unit 310. The beam passing through the main mirror 303, the central portion of which has half mirror characteristics, is reflected by the sub-mirror 104, and guided to the AF module 306 disposed on the bottom portion of the camera body 301. When the object has a low brightness and a low contrast, the auxiliary AF light source 309 emits light.

Figure 17:
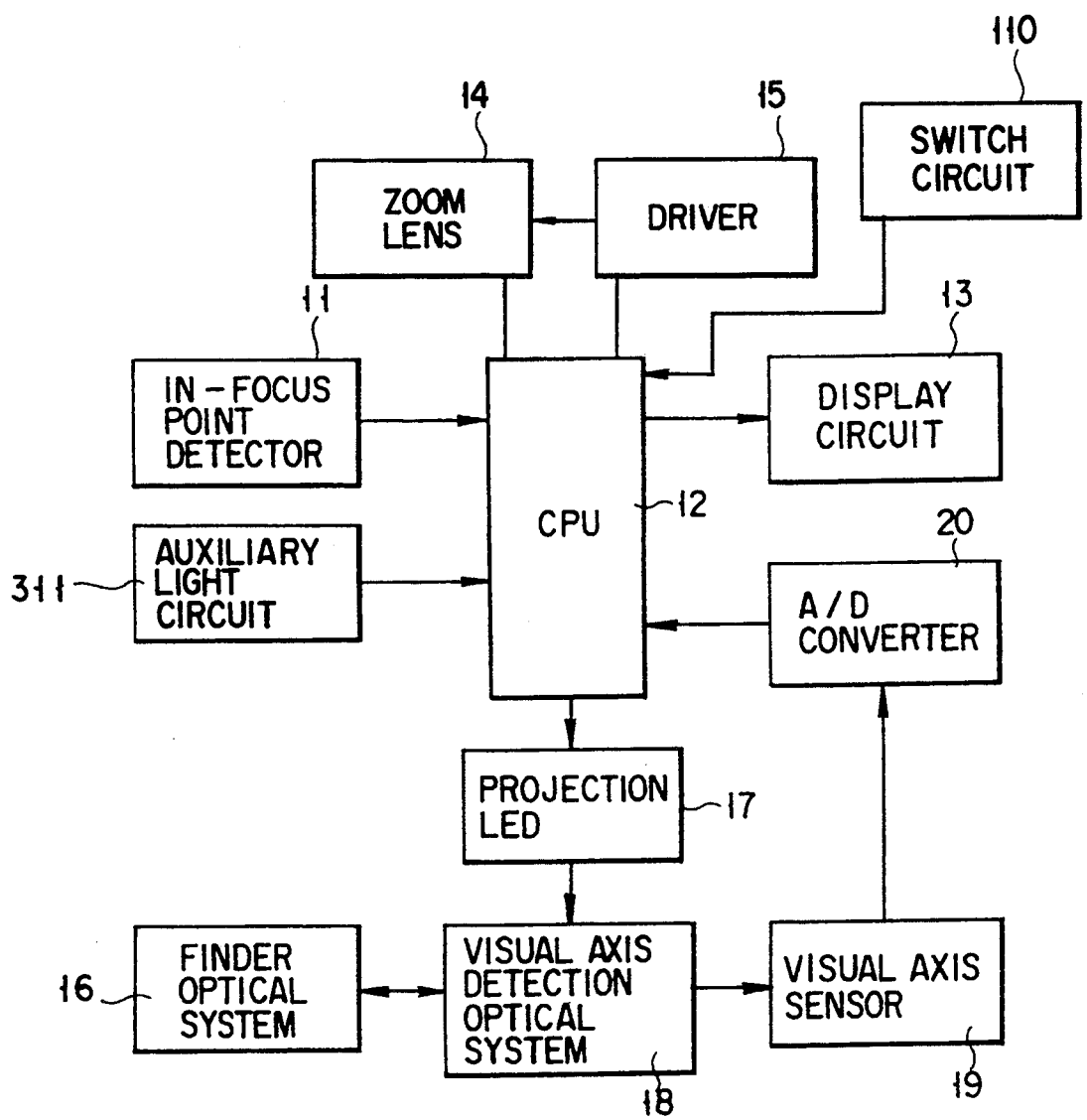
FIG. 17 is a view showing, in detail, the arrangement of the control system of the focus area setting apparatus according to the fourth embodiment.

FIG. 17 is an view showing in detail the arrangement of the control system of the focus area setting apparatus according to the fourth embodiment of the present invention.

As shown in FIG. 17, an in-focus point detector 11 is connected to a CPU 12. The CPU 12 is connected to a display circuit 13. The CPU 12 is also connected to the zoom lens 14 through a zoom driver 15. The output terminal of a zoom encoder for detecting the focal length of the zoom lens 14 is connected to the CPU 12. The CPU 12 is also connected to a projection LED 17. The projection LED 17 and a finder optical system 16 are connected to a visual axis sensor 19. The visual axis sensor 19 is connected to the CPU 12 through an A/D converter 20. The CPU 12 is also connected to an auxiliary light circuit 311 for emitting auxiliary light. A switch circuit 110 includes a 1st release switch which is turned by half-depressing a release button, and a 2nd release switch which is turned on when the releases button is completely depressed from the half-depressed state. The switch circuit 110 also includes a starter switch, e.g., an ON switch.

With this arrangement, upon reception of a command from the CPU 12, the projection LED 17 emits light to an eyeball (not shown) through the visual axis detection optical system 18 and the finder optical system 16. Light reflected by the eyeball is received by the visual axis sensor 19 through the finder optical system 16 and the visual axis detection optical system 18. An output signal from the visual axis sensor 19 is converted to a digital signal by the A/D converter 20 and input to the CPU 12. The in-focus point detector 11 performs distance measurement in all the focus areas. The CPU 12 selects in-focus point information on the basis of the signal output from the in-focus point detector 11, calculates the driving amount of the zoom lens 14, and outputs a driving amount signals to the driver 15. The zoom lens 14 is driven by the driver 15 on the basis of the driving amount signal.

The CPU 12 also detects the visual axis direction on the basis of the digital signal output from the A/D converter 20. If the visual axis direction falls within the visual axis detection area, a focus area is set, and focus area information is output to the display circuit 13. The display circuit 13 displays the information representing the focus area. If the visual axis direction falls outside the visual axis detection area, the CPU 12 outputs a display signal representing alarm information to the display circuit 13, and the display circuit 13 performs alarm display. The in-focus point detector 11 has a circuit configuration of a multiphase-difference AF scheme.

Figure 18:
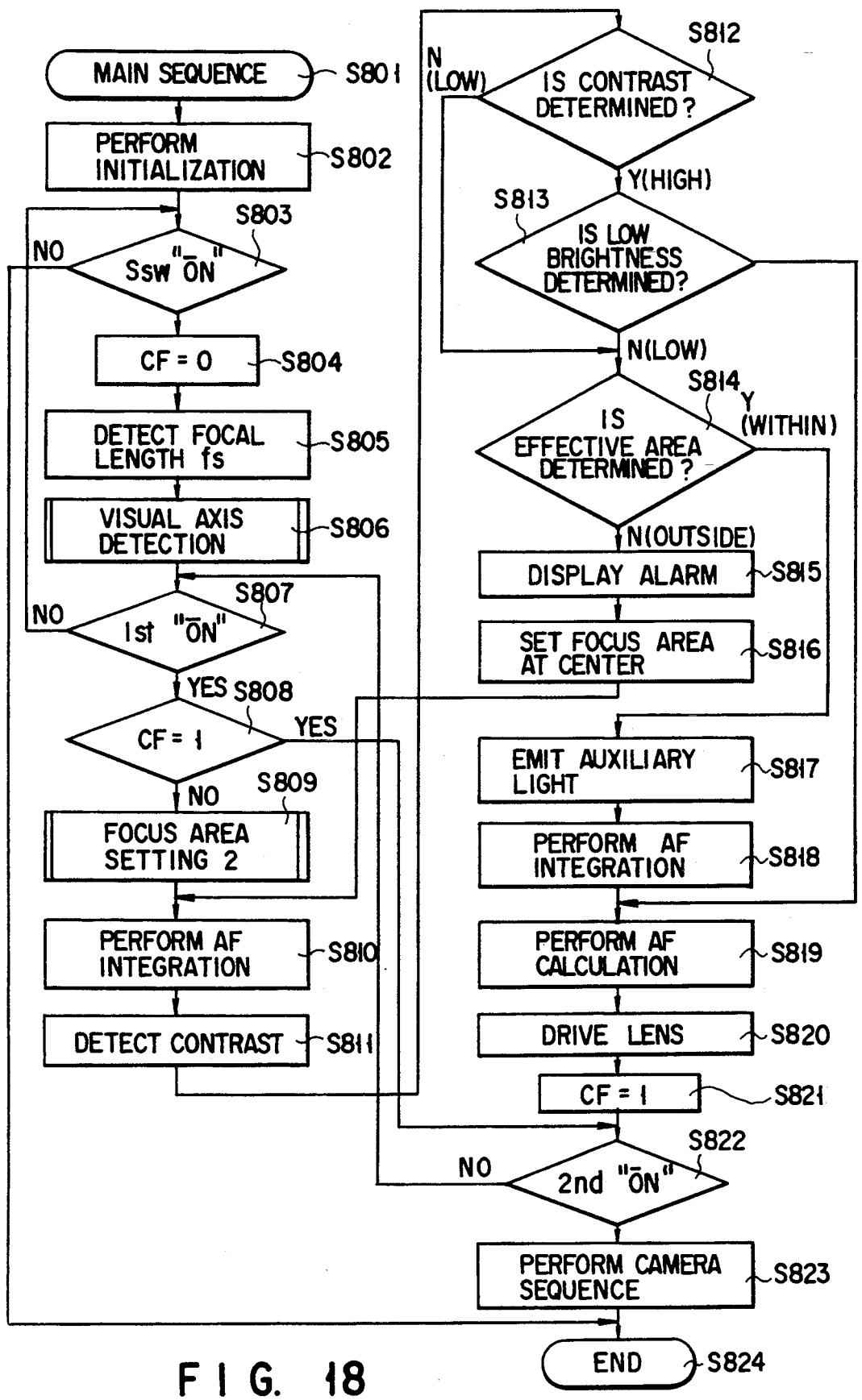
FIG. 18 is a flow chart showing the main sequence of the fourth embodiment.

The main sequence of the fourth embodiment of the present invention will be described with reference to the flow chart in FIG. 18.

When a battery is loaded and the main sequence is started (step S801), the CPU 12 sets the focus area at the center of the finder (step S802), and subsequently determines whether or not a starter switch ($S_{SW}$) is ON (step S803). If the switch ($S_{SW}$) has already been turned on, the CPU 12 then sets a flag CF to "0" (step S804) and detects focal length information fs from the output from the zoom encoder in the zoom lens 14 (step S805). The flag CF is a flag used for confirming whether or not a 1st release switch is just turned on. If the 1st release switch has already been turned on and a predetermined routine is performed, the flag CF is "1".

Subsequently, the CPU 12 executes the subroutine program "visual axis detection" previously shown in FIG. 5 (step S806), and determines whether or not the 1st release switch is ON (step S807). If the CPU 12 determines that the 1st release switch is OFF, the flow returns to step S803. If the CPU 12 determines that the 1st release switch is OH, it subsequently determines whether or not the flag CF is "1" (step S808). If the flag CF is "1" in step S808, the flow advances to step S822; if the flag CF is "0", the CPU 12 sets a focus area based on the latest visual axis detection information detected in step S806 (step S809). This focus area is set in accordance with the same processing operation as in the subroutine program previously shown in FIG. 12. The CPU 12 then performs integration of the visual axis sensor 19, reads out a signal corresponding to the selected focus area from the AF sensor, and A/D-converts the signal by the A/D converter 20 (step S810). Then, the CPU 12 detects, as the contrast value, the sum of the difference values of the adjacent pixels on the basis of the digital output from the visual axis sensor 19 (step S811). Subsequently, the CPU 12 determines whether the contrast value is larger or smaller than a predetermined value (step S812). If the detected contrast value is equal to or less than the predetermined value, the flow advances to step S814; if it exceeds the predetermined value, the CPU 12 determines whether or not the object has a low brightness. In this case, if the corresponding integration time in step S810 of the visual axis sensor 19 is longer than a predetermined time, the CPU 12 determines that the object has a low brightness (step S813).

In step S813, if the CPU 12 does not determine that the object has a low brightness, the flow advances to step S819. If the CPU 12 determines that the object has a low brightness, it performs an effective area determination, i.e., it determines whether or not the corresponding focus area falls within the effective auxiliary range (the area determined by the focal length information and the angle of projection of the auxiliary light; the sizes of this area in the x direction are the same on the right and left sides with respect to the center as the origin) (step S814).

This determination is performed in the following manner. More specifically, the CPU 12 calculates an auxiliary area $L_{FL}$ at a focal length fs in accordance with the following equation:

$$L_{FL} = L_{LF}' * (fs/fa') \qquad (3)$$

where $L_{FL}'$ is an auxiliary area in the finder at a predetermined focal length fa' on the wide-angle side of the auxiliary light. The CPU 12 determines whether the visual axis coordinate x obtained in step S806 falls within this auxiliary area. If $$|x| \leq L_{FL}/2$$

is established, the focus area determined by the visual axis falls within the auxiliary area. Therefore, the CPU 12 determines that the focus area is within the effective area.

If the corresponding focus area is outside the effective area of the auxiliary light, the CPU 12 performs alarm display (step S815), and forcibly sets the focus area at the center of the finder again. Then, the flow returns to step S810 (step S816).

If the corresponding focus area is within the effective area of the auxiliary light, the CPU 12 causes the auxiliary light circuit 311 to emit light (step S817), and performs integration of the visual axis sensor 19 (step S818). After integration, the CPU 12 calculates a defocus amount on the basis of the output from the visual axis sensor 19, and performs the AF calculation, e.g., calculates a lens driving amount, on the basis of the defocus amount (step S819). Subsequently, the CPU 12 drives the zoom lens 14 by the calculated lens driving amount (step S820), and sets the flag CF to "1" (step S821).

The CPU 12 then determines whether or not the 2nd release switch in the switch circuit 110 is ON (step S822). If the 2nd release switch is OFF, the flow returns to step S807; if it is ON, a camera sequence following the AF calculation, e.g., exposure, the film winding operation, and the like (step S823) is performed, and the flow ends this sequence (step S824).

The phase-difference scheme in-focus point detection method can also employ techniques disclosed in, e.g., Published Unexamined Japanese Patent Application Nos. 63-11906, 57-16411, 62-102213, and 62-100718, and U.S. Pat. No. 4,509,842.

Figure 19:
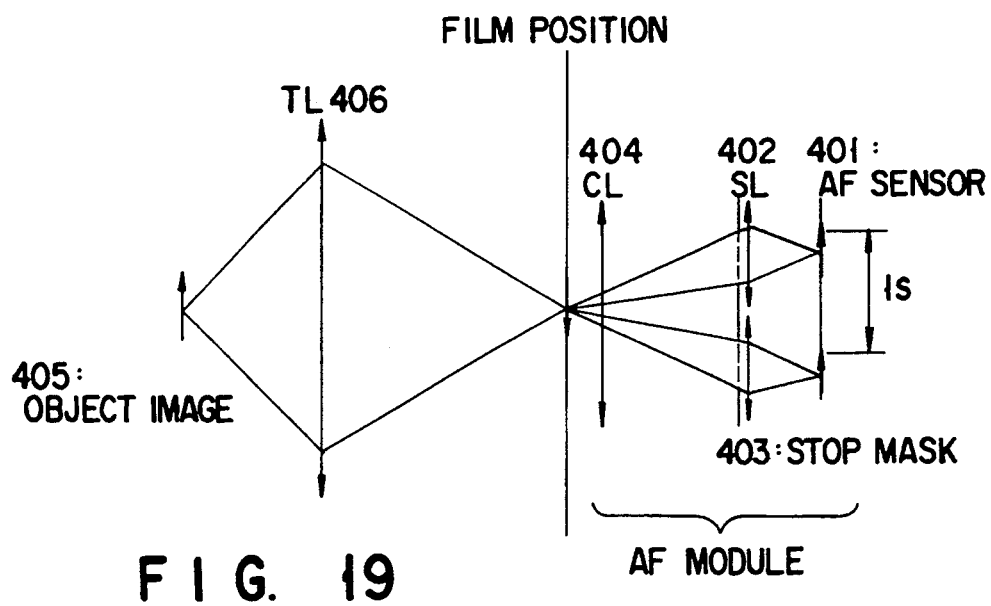
FIG. 19 is a view showing the arrangement of an AF module.

FIG. 19 is a view showing the arrangement of such an AF module.

Referring to FIG. 19, an object image 405 is transmitted to a position equivalent to a film position through a lens TL 406. The image at the position equivalent to the film position is transmitted through a condenser lens CL 404 disposed near the position equivalent to the film position. Pupil separation of the lens TL 406 that transmits the image is performed by a separator lens SL 402 through a stop mask 403, and the two separated images are detected by an AF sensor 401. Since the distance between the two images corresponds to the defocus amount, auto-focusing can be performed by detecting the distance between these two images.

Figure 20A:
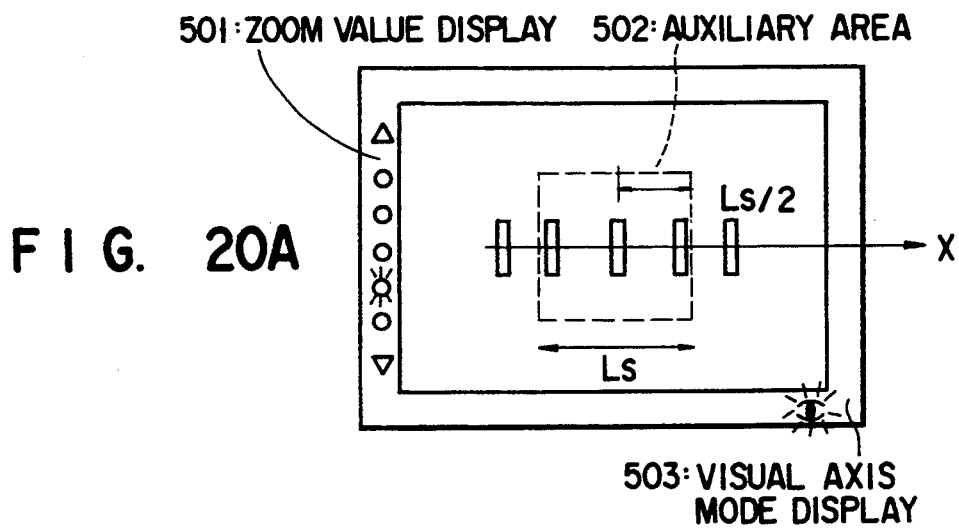
FIG. 20A is a view showing a state wherein the photographic lens is in a wide state and auxiliary light is required.
Figure 20B:
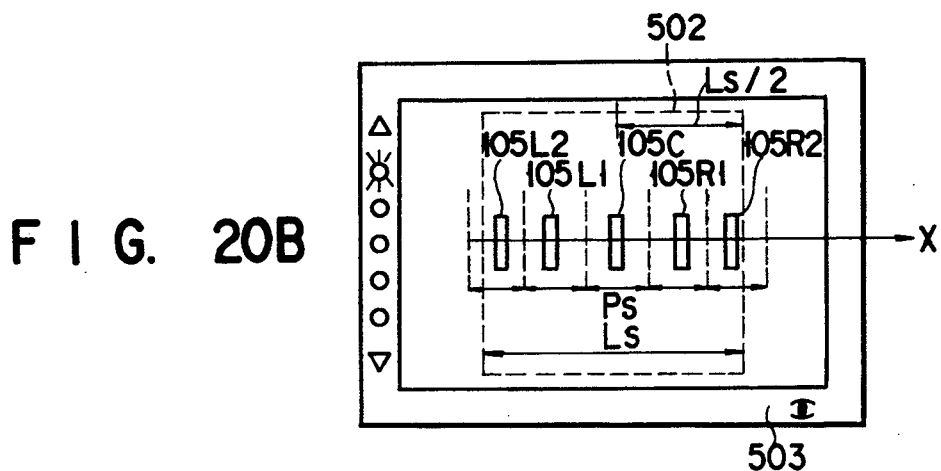
FIG. 20B is a view showing a state wherein the photographic lens is in a telephoto state and auxiliary light is required.

FIGS. 20A and 20B show practical examples of finder display. A zoom value display 501 of the photographic lens and a visual axis mode display 503 are provided on the peripheral portion of the finder.

FIG. 20A shows a state wherein the photographic lens is in the wide-angle state and auxiliary light is needed. In FIG. 20A, the right most focus area is selected by the visual axis. In this case, an auxiliary area 502 is indicated by a broken line. Since the right most focus area is located outside the auxiliary area 502, this fact is informed to the user instep S815 by flickering the visual axis mode display 503.

FIG. 20B shows a state wherein the photographic lens is in the telephoto state and auxiliary light is needed. In FIG. 20B, the right most focus area is selected by the visual axis. In this case, since the auxiliary area 502 covers all the focus areas, the visual axis mode display 503 does not display an alarm.

As is seen from FIGS. 20A and 20B, since the radiation range of the auxiliary light on the photographic screen is changed in accordance with the focal length of the zoom lens 14, whether or not auxiliary light is to be radiated is determined in accordance with whether the visual axis is located within this range that changes.

In this manner, according to the fourth embodiment of the present invention, focus area selection by means of the visual axis can be effectively used also in an AF system that uses auxiliary light. The flow chart of the AF sequence can be variously changed to match the system.

Figure 21:
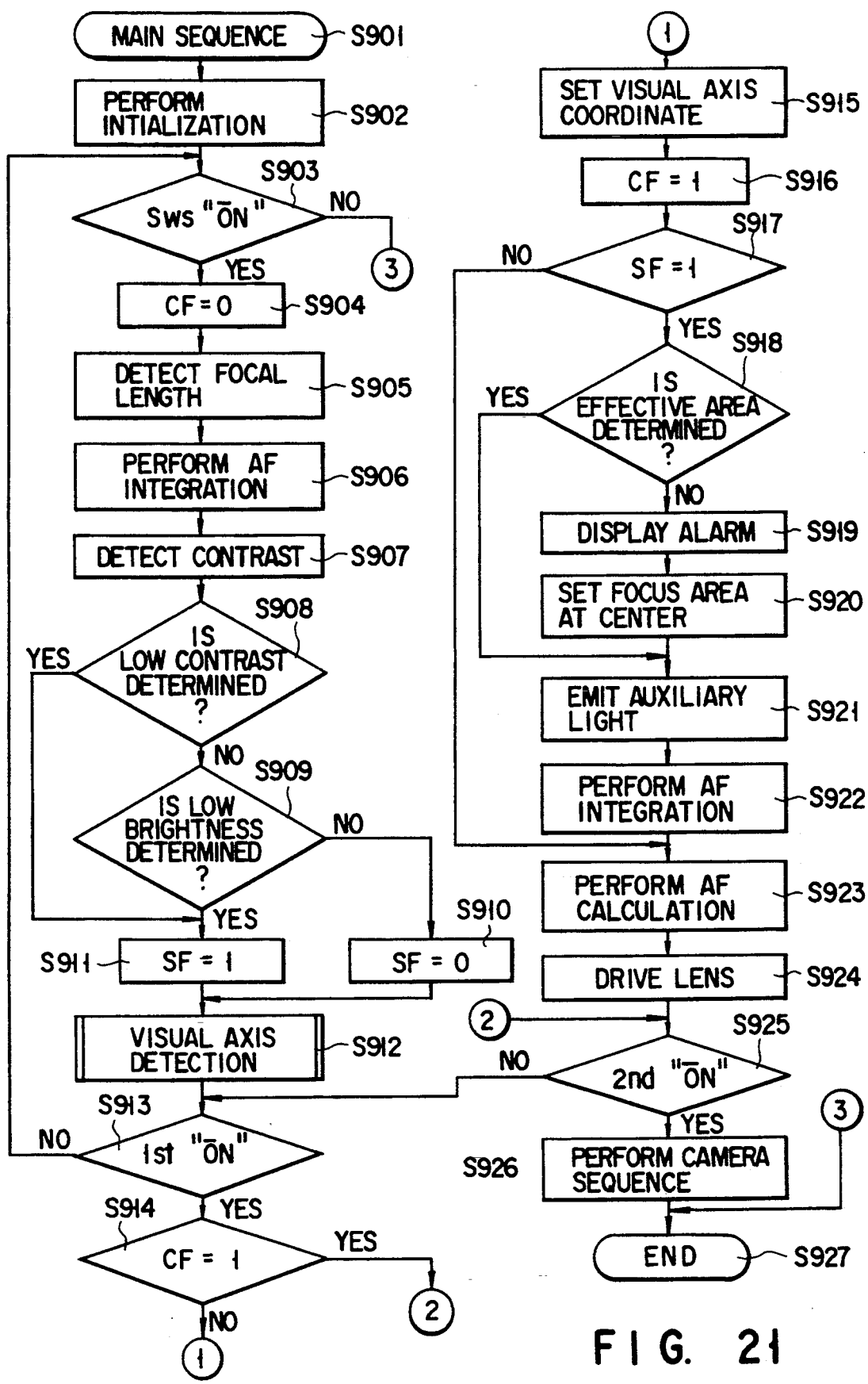
FIG. 21 is a flow chart showing an improvement in an AF sequence.

An improvement in the AF sequence will be described with reference to FIG. 21.

When the main sequence is started (step S901), the CPU 12 sets the focus area at the center of the finder (step S902), and determines whether or not the starter switch ($S_{sw}$) is ON. If the starter switch $S_{sw}$ in ON, the flow advances to step S904; if it is not ON, the flow ends this sequence (ste S927).

In step S904, the CPU 12 sets the flag CF to "0" and detects a focal length (step S905). Then, the CPU 12 performs AF integration (step S906) and detects the contrast (step S907). Subsequently, the CPU 12 determines whether or not the object has a low contrast (step S908). If the CPU 12 determines that the object has a low contrast, the flow advances to step S911; if it determines that the object does not have a low contrast, the CPU 12 successively determines whether or not the object has a low brightness (step S909).

In step S909, if the CPU 12 determines that the object has a low brightness, the flow advances to step S911 to set the flag SF to "1"; if it determines that the object does not have a low brightness, the CPU 12 sets the flag SF to "0", and the flow advances to step S912.

The CPU 12 executes the subroutine program "visual axis detection" previously shown in FIG. 5 in step S912, and detects whether or not the 1st release switch is ON in step S914. If the 1st release switch is not ON in step S914, the flow returns to step S903; if it is ON, the flow advances to step S913.

In step S913, the CPU 12 detects whether or not the flag CF is "1". If the flag CF is "1" in step S913, the flow advances to step S925; if it is "0", the flow advances to step S915 to set the visual axis coordinate. Subsequently, the CPU 12 sets the flag CF to "1" (step S916) and detects whether or not the flag SF is "1" (step S917). If the flag SF is "0" in step S917, the flow advances to step S923; if it is "1", the flow advances to step S918.

In step S918, the CPU 12 determines whether or not the visual axis coordinate is within the effective area. If the visual axis coordinate is within the effective area instep S918, the flow advances to step S921. If the visual axis coordinate is outside the effective area, the CPU 12 performs alarm display 9 step S919) and sets the focus area at the center of the finder (step S920). Then, the flow advances to step S921.

In step S921, the CPU 12 causes the auxiliary light circuit 311 to emit light (step S921), performs AF integration (S922), and performs an AF calculation (step S923). The CPU 12 then drives the zoom lens 14 (step S924) and determines whether or not the 2nd release switch is ON (step S925). Instep S925, if the 2nd release switch is OFF, the flow returns to step S914; if it is ON, the camera sequence is performed (step S926), and all the sequences are ended (step S927).

In this manner, when the pre-processing such as AF integration is performed before the 1st release switch is turned on, a time after the 1st release switch is turned on can be shortened.

In this case, the AF scheme may be of the contrast scheme.

Preferred embodiments of the focus area setting apparatus according to the present invention have been described so far. The present invention is not limited to them, and various changes and modifications can naturally be made. For example, in-focus point detection of the respective focus areas may be performed before visual axis detection, and an in-focus detection signal may be selected after visual axis detection. When the visual axis direction falls outside the preset area, initialization is performed. However, a focus area may be temporarily set at a nearest region.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A focus area setting apparatus of a camera having a finder, comprising:
    a zoom lens;
    focal length detecting means for detecting a focal length of said zoom lens;
    distance measuring means for detecting distances of an object at a plurality of distance measurement points without using said zoom lens;
    visual axis direction detecting means, provided near said finder of said camera, for detecting a visual axis direction of a user;
    determining means for obtaining a distance measurement enable range Ls in accordance with an equation:

$$Ls = La \times (fs/fa)$$

where fs is a focal length detected by said focal length detecting means, fa is a focal length of said zoom lens at a wide-angle side thereof, and La is a distance measurement enable range at the wide-angle side of said zoom lens, and determining whether or not the visual axis direction of the user detected by said visual axis direction detecting means is located within the distance measurement enable range Ls;
    focus area setting means for, when said determining means determines that the visual axis direction is located within the distance measurement enable range, selecting a distance measurement point, among the plurality of distance measurement points detected by said distance measuring means, which is closest to the visual axis direction of the user, and setting a focus area; and
    display means for displaying the focus area set by said focus area setting means.

2. An apparatus according to claim 1, wherein when said determining means determines that the visual axis direction of the user is not located within the distance measurement enable range, said display means performs alarm display.

3. A focus area setting apparatus of a camera having a finder, comprising:
   a zoom lens;
   focal length detecting means for detecting a focal length of said zoom lens;
   distance measuring means for detecting distances of an object at a plurality of distance measurement points without using said zoom lens;
   visual axis direction detecting means, provided near said finder of said camera, for detecting a visual axis direction of a user;
   focus area setting means for obtaining a resolution Ps at a focal length fs in accordance with an equation:

$$Ps = Pa \times (fa/fa)$$

where fs is a local length detected by said focal length detecting means, fa is a focal length of said zoom lens at a wide-angle side thereof, and Pa is a resolution at the wide-angle side of said zoom lens, selecting a distance measurement point, among the distances of the object at the plurality of distance measurement points detected by said distance measuring means, which is closest to the visual axis direction of the user detected by said visual axis direction detecting means, by using the resolution Ps, and setting a focus area; and
   display means for displaying the focus area set by said focus area setting means.

4. An apparatus according to claim 3, wherein when said focus area setting means does not set the visual axis direction of the user within the distance measurement enable range, alarm display is performed.

5. A focus area setting apparatus of a camera, comprising:
   a zoom lens having a variable focal length;
   a zoom finder having a magnification which is changed in accordance with a change in the focal length of said zoom lens;
   non-TTL distance measuring means capable of detecting distances of an object at a plurality of distance measurement points without using said zoom lens;
   visual axis detecting means, provided near said zoom finder, for detecting a visual axis direction of a user;
   calculating means for calculating a distance measurement enable range corresponding to the plurality of distance measurement points in said zoom finder on the basis of focal length information of said zoom lens;
   determining means for determining whether or not the visual axis direction detected by said visual axis detecting means is included in the distance measurement enable range; and
   display means for performing alarm display when said determining means determines the visual axis direction is not included in the distance measurement enable range.

6. An apparatus according to claim 5, further comprising second calculating means for calculating positions corresponding to the plurality of distance measurement points in said zoom finder on the basis of the focal length information of said zoom lens, and wherein said display means obtains and displays a position of the visual axis direction detected by said visual axis detecting means on the basis of an output from said calculating means when said determining means determines that the visual axis direction is included in the distance measurement enable range.

7. An apparatus according to claim 6, wherein said second calculating means calculates a resolution at a focal length fs in accordance with an equation:

$$Ls = La \times (fs/fa)$$

where fs is a current focal length of said zoom lens, fs is a focal length of said zoom lens at a wide-angle side thereof, and Pa is a resolution at the wide-angle side of said zoom lens.

8. An apparatus according to claim 5, wherein said calculating means calculates a distance measurement enable range Ls in accordance with an equation:

$$Ls = La \times (fs/fa)$$

where fs is a current focal length of said zoom lens, fa is a focal length of said zoom lens at a wide-angle side thereof, and La is a distance measurement enable rang eat the wide-angle side of said zoom lens.

9. A focus area setting apparatus of a camera having a finder, comprising:
   trimming setting means for setting a trimming area which is subjected to trimming;
   distance measuring means for detecting distances of an object at a plurality of distance measurement points;
   visual axis direction detecting means, provided near said finder of said camera, for detecting a visual axis direction of a user;
   determining means for comparing the trimming area with the visual axis direction and determining whether or not the visual axis direction is located in the trimming area;
   focus area setting means for selecting, when the determining means determines that the visual axis direction is located in the trimming area, a distance measurement point closest to the visual axis direction, and setting a focus area; and
   display means for displaying the focus area set by said focus area setting means.

10. An apparatus according to claim 9, wherein when said determining means determines that the visual axis direction is not located in the trimming area, alarm display is performed.

11. An apparatus according to claim 9, wherein said determining means determines that the visual axis direction is not located in the trimming area, a central distance measurement point, among the plurality of distance measurement point, is selected.

12. An apparatus according to claim 9, wherein said distance measuring means is a non-TTL distance measurement unit for measuring a distance without using a photographic lens.

13. An apparatus according to claim 9, wherein said distance measuring means is a TTL distance measurement unit for measuring a distance through a photographic lens.

14. A focus area setting means of a camera having a finder, comprising:
   field angle changing means for substantially changing a field angle;
   distance measuring means for detecting distances of an object at a plurality of distance measurement points, the distance measurement points in the finder being changed when the field angle is changed by said field angle changing means;

visual axis direction detecting means, provided near said finder of said camera, for detecting a visual axis direction of a user;

calculating means for calculating a distance measurement enable range determined by the plurality of distance measurement points on the basis of change information of the field angle changed by said field angle changing means; and focus area setting means for selecting, of the distance measurement enable range calculated by said calculating means, a distance measurement point closest to the visual axis direction of the user, and setting a focus area.

15. An apparatus according to claim 14, further comprising display means for displaying the focus area when said focus area setting means sets a focus area.

16. An apparatus according to claim 14, further comprising alarm means for performing alarm display when said focus area setting means does not set a focus area because the visual axis direction is not located in a trimming area.

17. An apparatus according to claim 14, wherein said distance measuring means detects the distances of the object not by using a photographic lens.

18. An apparatus according to claim 14, wherein said field angle changing means is a photographic lens having a variable focal length, and said finder is a zoom finder.

19. An apparatus according to claim 14, wherein said field angle changing means is trimming setting means for selecting a pseudo visual field range smaller than an actual visual field of a photographic lens, and said finder has a fixed magnification and displays the selected pseudo visual field range.

20. A focus area setting apparatus of a camera having a finder, comprising:

a photographic lens;

focal length output means for outputting a focal length of said photographic lens;

distance measuring means for detecting distances of an object at a plurality of distance measurement points through said photographic lens;

auxiliary light source means for auxiliary illuminating the object at a predetermined angle range in detection of the distances of the object;

visual axis direction detecting means, provided near said finder of said camera, for detecting the visual axis direction of a user;

focus area setting means for selecting a distance measurement point closest to the visual axis direction to set a focus area when the visual axis direction, detected by said visual axis detecting means on the basis of information representing the detected focal length and information representing the angle range at which said auxiliary light source is capable of projecting light, is located within a range at which light is to be projected by said auxiliary light source; and display means for displaying the focus area set by said focus area setting means.

21. An apparatus according to claim 20, further comprising display means for displaying the focus area when said focus area setting means sets a focus area.

22. An apparatus according to claim 20, wherein when said focus area setting means determines that the visual axis direction is not located in the range at which light is projected by said auxiliary light source, alarm display is performed.

23. An apparatus according to claim 20, wherein said distance measuring means is a phase difference distance measurement type distance measurement unit for detecting a phase difference of an object image through said zoom lens.

24. A camera capable of measuring a distance of an object located within a predetermined field angle on a photographic screen, comprising:

field angle changing means for changing a field angle of said photographic screen;

calculating means for calculating a distance measurement enable area in said photographic screen in accordance with field angle information supplied from said field angle changing means, the distance measurement enable area in a finder being changed when the field angle is changed by said field angle changing means;

visual axis direction detecting means for detecting a visual axis direction of a user; and display means for displaying a focus area on the basis of an output from said calculating means and an output from said visual axis direction detecting means.

25. A camera according to claim 24, wherein said visual axis direction detecting means comprises means for projecting light to a pupil of the user through part of a finder optical system of said camera, and means for receiving light reflected by the pupil of the user.

26. A camera according to claim 24, wherein said field angle changing means has a photographic optical system having a variable focal length, and said calculating means calculates the distance measurement enable focus area on the basis of information representing a field angle of said photographic optical system and information representing a predetermined field angle within which distance measurement is possible.

27. A camera according to claim 24, wherein said camera has a auxiliary light means for projecting auxiliary light having a predetermined radiation angle to the object.

said field angle changing means has a photographic optical system having a variable focal length, and said calculating means calculates the distance measurement enable focus area on the basis of the information representing a field angle of said photographic optical system and information representing the radiation angle of said auxiliary light means.

28. A camera according to claim 24, wherein said field angle changing means has trimming setting means for setting a trimming range which is subjected to trimming, and said calculating means calculates the distance measurement enable focus area on the basis of the trimming range set by said trimming setting means.

29. A camera capable of measuring a distance of an object located within a predetermined field angle on a photographic screen, comprising:

field angle changing means for changing a field angle of said photographic screen;

calculating means for calculating a distance measurement enable area in said photographic screen in accordance with field angle information supplied from said field angle changing means;

visual axis direction detecting means for detecting a visual axis direction of a user;

determining means for determining whether or not the visual axis of the user is located in the distance measurement enable area from an output from said visual axis direction detecting means and an output from said calculating means; and display means for performing alarm display when said determining means determines that the visual axis of the user is located outside the distance measurement enable area.

30. A camera according to claim 29, wherein said visual axis direction detecting means comprises means for projecting light to a pupil of the user through part of a finder optical system of said camera, and means for receiving light reflected by the pupil of the user.

31. A camera according to claim 29, wherein
said field angle changing means has a photographic optical system having a variable focal length, and
said calculating means calculates the distance measurement enable focus area on the basis of information representing a field angle of said photographic optical system and information representing a predetermined field angle within which distance measurement is possible.

32. A camera according to claim 29, wherein
said camera has auxiliary light means for projecting auxiliary light having a predetermined radiation angle to the object,
said field angle changing means has a photographic optical system having a variable focal length, and
said calculating means calculates the distance measurement enable focus area on the basis of the information representing a field angle of said photographic optical system and information representing the radiation angle of said auxiliary light means.

33. A camera according to claim 29, wherein
said field angle changing means has trimming setting means for setting a trimming range which is subjected to trimming, and
said calculating means calculates the distance measurement enable focus area on the basis of the trimming range set by said trimming setting means.

34. A focus area setting apparatus of a camera capable of detecting a distance of an object located in a plurality of areas within a photographic screen, comprising:
calculating means for calculating a distance measurement enable area in a finder;
visual axis direction detecting means for detecting a visual axis direction of a user directed to said finder;
determining means for determining whether or not the visual axis of the user is located in the distance measurement enable area from an output from said visual axis direction detecting means and an output from said calculating means; and
display means for performing alarm display when said determining means determines that the visual axis of the user is located outside the distance measurement enable area.

35. An apparatus according to claim 34, further comprising control means for selecting a predetermined area in the plurality of area as a focus area when said determining means determines that a distance measurement enable area is not located in the visual axis direction.

36. An apparatus according to claim 34, wherein said visual axis direction detecting means comprises means for projecting light to a pupil of the user through part of an optical system of said finder and means for receiving light reflected by the pupil of the user.

37. An apparatus according to claim 34, wherein said camera has an optical system having a variable field angle, and
said calculating means calculates the distance measurement enable on the basis of information representing a field angle of said optical system.

38. An apparatus according to claim 34, wherein
said camera has auxiliary light means for projecting light to the object located in a predetermined range, and
said calculating means calculates the distance measurement enable focus area on the basis of information representing a light-projecting range of said auxiliary light means.

39. An apparatus according to claim 34, wherein
said camera has trimming setting means for setting a trimming range which is subjected to trimming, and
said calculating means calculates the distance measurement enable focus area on the basis of the trimming range set by said trimming setting means.

40. A camera capable of measuring distances in a plurality of areas in a photographic screen, comprising:
visual axis direction detecting means for detecting a visual axis direction of a user directed to a finder;
determining means for determining whether or not a distance measurement enable area is located in an area in said finder which is detected by said visual axis direction detecting means; and
display means for performing alarm display when said determining means determines that a distance measurement enable area is not located in the visual axis direction.

41. A camera according to claim 40, further comprising control means for selecting a predetermined area in the plurality of areas as a focus area when said determining means determines that a distance measurement enable area is not located in the visual axis direction.

42. A camera according to claim 40, wherein said visual axis direction detecting means comprises means for projecting light to a pupil of the user through part of a finder optical system of said camera and means for receiving light reflected by the pupil of the user.

43. A camera according to claim 40, wherein
said camera has a photographic optical system having a variable photographic field angle, and
said determining means has calculating means for calculating a distance measurement enable area in said finder on the basis of information representing a field angle of said photographic optical system and information representing the plurality of measurement distance enable areas.

44. A camera according to claim 40, wherein
said camera has auxiliary light means for projecting auxiliary light having a predetermined radiation angle to an object and a photographic optical system having a variable focal length, and
said determining means has calculating means for calculating the distance measurement enable area in said finder on the basis of information representing a field angle of said photographic optical system and information representing the radiation angle of said auxiliary light means.

45. A camera according to claim 40, wherein said camera has trimming setting means for setting a trimming range which is subjected to trimming, and said determining means has calculating means for calculating the distance measurement enable area in said finder on the basis of the trimming range set by said trimming setting means.

46. A focus area setting apparatus of a camera, which is capable of detecting a distance of an object located in a plurality of areas in a photographic screen and in which a distance measurement enable area in a finder is changed in accordance with a change in a field angle of said photographic screen, comprising:

output means for outputting information representing the field angle of said photographic screen;

calculating means for calculating the distance measurement enable area in said finder on the basis of the field angle information output from said output means;

visual axis direction detecting means for detecting a visual axis direction of the user directed to said finder; and selecting means for selecting one of the plurality of areas on the basis of an output from said calculating means and an output from said visual axis direction detecting means.

47. A camera according to claim 46, wherein said visual axis direction detecting means comprises means for projecting light to a pupil of the user through part of a finder optical system of said camera and means for receiving light reflected by the pupil of the user.

48. A focus area setting means of a camera having a finder, said finder being a zoom finder;

field angle changing means for substantially changing a field angle, said field angle changing means being a photographic lens having a variable focal length;

distance measuring means for detecting distances of an object at a plurality of distance measurement points;

visual axis direction detecting means, provided near said finder of said camera, for detecting a visual axis direction of a user;

calculating means for calculating a distance measurement enable range determined by the plurality of distance measurement points on a basis of change information of the field angle changed by said field angle changing means; and focus area setting means for selecting, of the distance measurement enable range calculated by said calculating means, a distance measurement point closest to the visual axis direction of the user, and setting a focus area.

49. A focus area setting means of a camera having a finder, said finder having a fixed magnification and displaying the selected pseudo visual field range;

field angle changing means for substantially changing a field angle, said field angle changing means comprising trimming setting means for selecting a pseudo visual field range which is smaller than an actual visual field of a photographic lens;

distance measuring means for detecting distances of an object at a plurality of distance measurement points;

visual axis direction detecting means, provided near said finder of said camera, for detecting a visual axis direction of a user;

calculating means for calculating a distance measurement enable range determined by the plurality of distance measurement points on a basis of change information of the field angle changed by said field angle changing means; and focus area setting means for selecting, of the distance measurement enable range calculated by said calculating means, a distance measurement point closest to the visual axis direction of the user, and setting a focus area.

50. A camera capable of measuring a distance to an object located within a predetermined field angle on a photographic screen, said camera comprising:

auxiliary light means for projecting an auxiliary light having a predetermined radiation angle toward the object;

field angle changing means for changing a field angle of said photographic screen, said field angle changing means having a photographic optical system with a variable focal length;

calculating means for calculating a distance measurement enable area in said photographic screen in accordance with field angle information supplied from said field angle changing means, said calculating means calculating the distance measurement in order to enable a focus area on a basis of the information representing a field angle of said photographic optical system and information representing the radiation angle of said auxiliary light means;

visual axis direction detecting means for detecting a visual axis direction of a user; and display means for displaying a focus area on the basis of an output from said calculating means and an output from said visual axis direction detecting means.

51. A camera capable of a measuring a distance of an object located within a predetermined field angle on a photographic screen, said camera comprising:

field angle changing means for changing a field angle of said photographic screen, said field angle changing means having trimming setting means for setting a trimming range which is subjected to trimming, and calculating means for calculating a distance measurement enable area in said photographic screen in accordance with field angle information supplied from said field angle changing means, said calculating means calculating the distance measurement enable focus area on a basis of the trimming range set by said trimming setting means;

visual axis direction detecting means for detecting a visual axis direction of a ussr; and display means for displaying a focus area on the basis of an output from said calculating means and an output from said visual axis direction detecting means.

52. A camera capable of measuring distances in a plurality of areas in a photographic screen, said camera comprising:

visual axis direction detecting means for detecting a visual axis direction of a user directed to a finder;

determining means for determining whether or not a distance measurement enable area is located in an area in said finder which is detected by said visual axis direction detecting means;

display means for displaying this area when said determining means determines that a distance measurement enable area is located;

said camera having an auxiliary light means for projecting an auxiliary light having a predetermined radiation angle to an object and a photographic optical system having a variable focal length; and said determining means including calculating means for calculating the distance measurement enable area on a basis of information representing a field angle of said photographic optical system and information representing the radiation angle of said auxiliary light means.

53. A camera capable of measuring distances in a plurality of areas in a photographic screen, said camera comprising:

visual axis direction detecting means for detecting a visual axis direction of a user directed to a finder;

determining means for determining whether or not a distance measurement enable area is located in an area in said finder which is detected by said visual axis direction detecting means;

display means for displaying this area when said determining means determines that a distance measurement enable area is located;

said camera having trimming setting means for setting a trimming range which is subjected to trimming; and said determining means having a calculating means for calculating the distance measurement enable area in said finder on a basis of information representing the field angle of said photographic optical system and information representing the radiation angle of said auxiliary light means.

* * * * *